US008954349B2

(12) United States Patent
Tolcher

(10) Patent No.: US 8,954,349 B2
(45) Date of Patent: Feb. 10, 2015

(54) ORDERING SYSTEM AND ANCILLARY SERVICE CONTROL THROUGH TEXT MESSAGING

(71) Applicant: ParcelPoke Limited, Brighton, West Sussex (GB)

(72) Inventor: Richard Tolcher, Brighton (GB)

(73) Assignee: Parcelpoke Limited (GB)

( * ) Notice: Subject to any disclaimer, the term of this patent is extended or adjusted under 35 U.S.C. 154(b) by 0 days.

(21) Appl. No.: 14/216,702

(22) Filed: Mar. 17, 2014

(65) Prior Publication Data

US 2014/0279276 A1    Sep. 18, 2014

Related U.S. Application Data

(63) Continuation-in-part of application No. 13/843,448, filed on Mar. 15, 2013.

(30) Foreign Application Priority Data

Jul. 31, 2013  (GB) .................................. 1313717.9
Nov. 27, 2013  (GB) .................................. 1320922.6

(51) Int. Cl.
*G06Q 30/00*       (2012.01)
*G06Q 30/06*       (2012.01)
(Continued)

(52) U.S. Cl.
CPC ........ *G06Q 30/0635* (2013.01); *G06Q 20/3255* (2013.01); *G06Q 20/12* (2013.01); *G06Q 20/385* (2013.01); *G06Q 20/4012* (2013.01); *G06Q 20/425* (2013.01)
USPC ..................................... 705/26.81; 705/26.1

(58) Field of Classification Search
CPC .................................. G06Q 30/0601–30/0645
See application file for complete search history.

(56) References Cited

U.S. PATENT DOCUMENTS

2002/0026377 A1    2/2002  Takahashi
2004/0015554 A1*   1/2004  Wilson .......................... 709/206
(Continued)

FOREIGN PATENT DOCUMENTS

GB        2379066 A       2/2003
JP        2006323545      11/2006
WO        2012144850      10/2012

OTHER PUBLICATIONS

Barnett, N., Hodges, S., & Wilshire, M. J. (2000). M-commerce: An operator's manual. The McKinsey Quarterly, (3), 162-173.*
(Continued)

*Primary Examiner* — Resha Desai
(74) *Attorney, Agent, or Firm* — Maschoff Brennan

(57) ABSTRACT

A system allows control of an ancillary server function through a text messaging protocol. The text message allows a connected user to obtain goods or services through a network controller that selectively routes a self-addressed text message to a remote networked server that instantiates the server function based on content in the text message. The self-addressed electronic message (e.g., SMS message) is interpreted by a network component as needing invocation of a specified ordering service and, accordingly, is routed to a server that is tasked with administering, for example, order and delivery of a product or access to an account. The server, upon receipt of the self-addressed electronic message, may interact with the buyer using messaging to confirm the scope of the order and to fullfil the order. The system augments cellular phone functionality with a mechanism for placing orders using a looped text-yourself approach that engenders trust with users.

30 Claims, 11 Drawing Sheets

(51) Int. Cl.
*G06Q 20/32* (2012.01)
*G06Q 20/12* (2012.01)
*G06Q 20/38* (2012.01)
*G06Q 20/40* (2012.01)
*G06Q 20/42* (2012.01)

(56) References Cited

U.S. PATENT DOCUMENTS

| | | | |
|---|---|---|---|
| 2004/0139204 A1* | 7/2004 | Ergezinger et al. | 709/229 |
| 2005/0076084 A1* | 4/2005 | Loughmiller et al. | 709/206 |
| 2005/0160165 A1 | 7/2005 | Chen et al. | |
| 2007/0233732 A1 | 10/2007 | Porter | |
| 2008/0096592 A1 | 4/2008 | Waytena et al. | |
| 2013/0066722 A1 | 3/2013 | Alkatib | |
| 2014/0279281 A1 | 9/2014 | Tolcher | |

OTHER PUBLICATIONS

International Search Report mailed Aug. 13, 2014 in PCT Application No. PCT/GB2014/050831.

Search Report mailed Mar. 11, 2014 in GB application No. 1320922.6.

Combined Search and Exam Report mailed Mar. 10, 2014 in GB application No. 1313717.9.

* cited by examiner

ORDERING SYSTEM AND ANCILLARY SERVICE CONTROL THROUGH TEXT MESSAGING

BACKGROUND TO THE INVENTION

This invention relates, in general, to an ordering system and method for product or service delivery and is particularly, but not exclusively, applicable to a system and method allowing control of an ancillary service through a text messaging protocol.

SUMMARY OF THE PRIOR ART

In the context of on-line ordering, the "one-click" approach by Amazon® allows a registered user to make use of stored sensitive personal data, such as bank details, to obviate the need to re-enter and re-transmit such sensitive data over a wide area network, such as the Internet. At the point of each "one-click" order, the ordered product or gift is delivered to an address that is defined and always known (both to the account holder and the vendor, i.e. Amazon). In fact, one-click, whilst more efficient from the perspectives of data traffic, security and both rapidness and accuracy of data entry, the system requires, from the outset, the identification of the recipient address. This recipient address (which may be the user's home postal address) is logged against a user account.

There are also issues relating to the veracity of email notifications. For example, in the context of a gift, the recipient potentially has no idea that such a gift has been ordered until: (i) the gift physically arrives; (ii) they are notified directly by the account holder responsible for ordering the gift, e.g. making use of direct recipient contact through chat on a social media site; or otherwise (iii) a notification email is received by the recipient from either the supplier or a delivery company tasked with physical delivery. Unfortunately, with growing levels of cyber-attack arising both in malicious email attachments and spam emails, any notification email may be viewed by a gift recipient with some cynicism, if not entirely ignored. A question therefore remains about how assurances can be provided to a recipient that the email notification is bona fide and that the email address is that of a trusted delivery organization tasked with delivery of any physical gift.

Network operators have supported on-line voting in game shows and, indeed, occasional purchase of services, such as parking, through the use of a smartphone. These services generally impose a premium network charge on the user, with service providers frequently seeing a relatively small percentage of the money paid by the user and charged against the user's monthly account. For merely supporting the service, and taking out the need for manual labour, the network operator views their percentage as reasonable, albeit that the user and the service provider ultimately pays a much higher price.

Shortcodes (also known as short numbers) are special telephone numbers, significantly shorter than full telephone numbers, that can be used to address SMS and MMS messages from certain service providers' mobile phones or fixed phones. There are a number of endemic problems with shortcode use. Users need to rely on remembering shortcode numbers, often requiring different numbers for different services. Users often don't trust shortcodes given that they are often associated with reverse charge Premium SMS and the Adult Industry. Users can't reliably send text messages to shortcodes owing to some MNO's restrictions. Shortcodes frequency have an age-restricted usage policy, with minors are often blocked from using shortcodes. Dedicated shortcodes can take months to commission prior to use. Shared shortcodes necessarily result in user numbers and data being made available for all organisations sharing that shortcode, and this can result in unauthorised access to a user's mobile numbers and the data sent over those shortcodes; Shortcodes can be expensive, costing thousands of pounds a month for a dedicated shortcode and frequently have a significant initial setup fee. Rules regarding shortcode use are extensive and, the UK, run to hundreds of pages of obligations and restrictions. The process of shortcodes therefore presents challenges, difficulties and inconveniences for both the owner of the shortcode and the user of the shortcode in a telecoms environment.

SUMMARY OF THE INVENTION

According to a first aspect of the invention there is provided a method of accessing and controlling a server-administered function via a network controller of a text messaging system, the server-administered function running on a server functionally distinct to the network controller and wherein the server-administered function provides a user with a service when the user communicates a registered identity, the method comprising: at the network controller, receiving over a communications network multiple text messages that each contain at least one address; using control logic to make an assessment about each of said received text messages to identify: i) as a relevant message, a text message that includes a self-addressed routing direction used as the registered identity; and ii) other messages that do not contain any self-addressed routing direction and are messages that are unrelated to control of the server-administered function; based on the assessment, causing the network controller to select each relevant message and communicate at least part of each relevant message—to said server, otherwise causing the network controller to route over the communications network each of said other messages to said at least one address identified in that other message; deriving an instruction from the relevant message, the instruction relating to the service; and at the server, invoking the server-administered function based at least in part on the instruction derived from the relevant message to support access of the user to the service through the user device.

In a second aspect of the invention there is provided a method of accessing and controlling a server-administered function on a server located remotely from a network controller of a text messaging system, the server connected to the network controller through a communications network and wherein the server-administered function provides a user with a service when the user communicates a registered identity associated with either the user or a device used by the user to compile a text message, the method comprising: at the network controller, receiving over the communications network multiple text messages; using control logic to make an assessment about each of said received text messages to identify a relevant message that refers to the registered identity; causing the network controller to communicate at least part of the relevant message to said remotely located server; deriving an instruction from the relevant message, the instruction relating to the service; and at the server, invoking the server-administered function based at least in part on the instruction derived from the relevant message to support access of the user to the service through the user device.

In a preferred embodiment, the step of invoking the server-administered function is based on the nature of addressing of the text message as received at the network controller.

The step of invoking the server-administered function is preferably triggered by the text message having a self-addressed routing direction.

Selective communication of the relevant message may be based at least in part of a trigger word or trigger phrase included in the received text message, with the instruction typically derived from the relevant message is content contained within a body portion of the text message. The instruction derived from the relevant message may be an encrypted version of the content contained within the body portion of text message received at the network controller.

In a preferred embodiment, the assessment step is conducted at the network controller. The network controller may be an SMSc. In the alternative, the assessment step may be conducted externally to the SMSc in a third party device, such as an administrator server located between the SMSc and the remote server providing the service to the user. In these particular arrangements, the administration server is configured to instruct the remotely located server to undertake the server-administered function.

The network controller may be arranged to route the received text message to another address in the event that a determination identifies that: registration is not sought from the device used to compile the text message; or registration of the device for the service has not previously occurred; or an address header of the text message does not contain a looped routing direction.

Based on an assessment of completeness of the instruction received in the relevant message, the server may establish an interactive dialogue between the server and the user, the interactive dialogue seeking or providing additional detail concerning the instruction. The interactive dialogue may be entirely based on text queries and replies over the messaging network.

In one embodiment, the registered identity is a mobile number.

In another aspect of the invention there is provided a method of accessing and controlling a server-administered function on a server located remotely from a network controller of a text messaging system, the server connected to the network controller through a communications network and wherein the server-administered function provides a registered user with a service, the method comprising: at the network controller, receiving over the communications network a text message from a device; based on an assessment of registration of the device with the server, selectively communicating at least part of the received text message to said remotely located server; for devices registered for the service, extracting an instruction derived from the text message; and at the server, invoking the server-administered function for the device based at least in part on the instruction received in the text message.

In a further aspect of the present invention there is provided a system supporting remote control of a server-administered function, the system comprising: a network controller of a text messaging system, the network controller configured to receive multiple text messages; a server supporting the server-administered function and configured to provide a user with a service in response to the user communicating a registered identity, the server functionally distinct to the network controller; a communications network supporting at least transmission of multiple text messages, each text message including an address: control logic configured to make an assessment about each of said received messages to identify: i) as a relevant message, a text message that includes a self-addressed routing direction used as the registered identity; and ii) other messages that do not contain any self-addressed routing direction and are messages that are unrelated to control of the server-administered function; wherein the network controller, responsive to the assessment, is configured to select each relevant message and to communicate at least part of each relevant message—to said server, otherwise to cause the network controller to route over the communications network each of said other messages to said at least one address identified in that other message; and the server is configured to derive an instruction from any received relevant message and is further configured to support access of the user to the service through the user device by invoking the server-administered function based at least in part on the instruction derived from the relevant message, thereby to support access of the user to the service and wherein the instruction relates to the service supported by the server.

In still yet a further aspect of the present invention there is provided a system supporting remote control of a server-administered function, the system comprising: a server supporting the server-administered function thereby to provide a user with a service in response to the user communicating a registered identity associated with either the user or a device used by the user to compile a text message; a network controller of a text messaging system, the network controller located remotely from the server and arranged to receive multiple text messages; a communications network connecting the network controller to the server, the communication unit supporting at least transmission of text messages: control logic configured to make an assessment about each of said received messages to identify a relevant message that refers to the registered identity; wherein the network controller, in response to the assessment of the control logic, is configured to communicate at least part of the relevant message—to said remotely located server; and the server is configured to support access of the user to the service through the user device by invoking the server-administered function based at least in part on an instruction derived from the relevant message, wherein the instruction relates to the service supported by the server.

Invoking the server-administered function is preferably based on the nature of addressing of the text message as received at the network controller. Preferably, invoking the server-administered function is triggered by the text message having a self-addressed routing direction.

Selective communication of the relevant message is preferably based at least in part of a trigger word or trigger phrase included in the received text message. The instruction derived from the relevant message may be content contained within a body portion of the text message.

In a preferred embodiment, the network controller includes the control logic configured to identify the relevant message that references the registered identity. Alternatively, the control logic is remote to and external from the network controller, the control logic arranged to make reference to a look-up table networked within the system.

The network controller may be an SMSc and the text message may be an SMS message or otherwise a text message that at least partially uses a proprietary text messaging protocol.

In another aspect of the invention there is provided a network controller of a text messaging system, the network controller located remotely from a server supporting remote control of a server-administered function providing a user-accessible service, the network controller coupled to receive text messages and configured to be operationally responsive to an assessment about whether a received text message refers to a registered identity associated with either a user or a device used by the user to compile a text message, the registered identity providing access to and control of the server-administered function, wherein the network controller is configured, in response to identified presence of the registered identity, to communicate at least part of the received message—to said remotely located server to cause the server to invoke the server-administered function based at least in part on an instruction derived from the communicated received message, and wherein the instruction relates to the user-accessible service supported by the server.

The network controller is preferably configured to communicate the received text message to invoke the server-administered function when the text message has a self-addressed routing direction.

Selective communication of the received message by the network controller is typically based at least in part of a trigger word or trigger phrase included in the received text message. The instruction derived from the relevant message may be content contained within a body portion of the text message.

The network controller may include control logic configured to identify the received message that reference the registered identity.

Preferably, the network controller is configured to route the received text message to another address in the event that a determination identifies that: registration is not sought from the device used to compile the text message; or registration of the device for the service has not previously occurred; or an address header of the text message does not contain a looped routing direction.

The network controller is preferably an SMSc within a mobile network.

The network controller is typically configured to route received text messages based on one of: i) an address of the device used to compile the text message; ii) a user identity of the user of the device; iii) a mobile telephone number; and iv) a digital fingerprint realizing a device identity unique to the device used to compile the text message.

Advantageously, embodiments of the present invention provide network phone users with the ability to purchase goods or services through low-cost message exchanges initially intercepted by transaction management logic that provides an interface with a third party seller of goods or services. The system of the present invention therefore augments cellular phone functionality and usage by providing a mechanism for ordering products or services using a text-yourself order, with the financial transaction aspect to the order completed directly with the third party seller (or an intermediate nominee) based on an established user-registration process. Exposure to network operator charges is therefore significantly reduced, with the user benefiting from a secure and seamless system that permits their cellular phone to become a portal for wide-reaching purchase opportunities.

In a preferred embodiment, an order placement and delivery system that allows mobile phone users to obtain goods or services through a self-addressed electronic message that includes a product or service code outlining an intention to secure the identified product or service; this code represents an order instruction. The product code may, in one embodiment, be realised with the aid of locally acquired information, such as a captured image or a geo-location obtained from a GPS system or base station triangulation service, such as through Google Latitude. The self-addressed electronic message, which may be an SMS, is intercepted by a network component, such as an SMSc, and identified as an order request if the sender is recognized as a registered subscriber and provided that the product or service code can be legitimated. A service administrator, upon being engaged by the SMSc and sent the self-addressed electronic message, is configured to interact with the buyer (which may require messaging dialogue through a telecommunications network) to obtain and finally confirm the order instruction and then to bring about delivery of the goods or services or provision of a service, such as car parking Delivery may require the service administrator to instruct and authorize an external third party supplier, although goods or services may also be dispatched directly by the service administrator should this entity be a direct retailer. The system of the preferred embodiment therefore augments cellular phone functionality and usage by providing a mechanism for ordering products or services using a text-yourself order, with the financial transaction aspect to the order completed directly between a registered user and the service administrator.

In terms of system implementation, it is noted that someone "buying" a service/article will make use of a text message that has common, i.e. identical sender and recipient numbers. It is noted that this doesn't happen when using a conventional short code, e.g. "text your answer to 88523". Similarly, someone who is intent on sending a service/article to a third party selects a real-world recipient and not someone who owns a shortcode. Furthermore, the recipient's number will be a longcode, i.e. a regular mobile number. The challenges, difficulties and inconveniences of using shortcodes are eliminated through the text-yourself or text gifting technologies of the preferred embodiments described herein, especially since the major point of friction is reduced through the provision and use of a unified, trusted and convenient way for users to text themselves in order to activate an intended service. Through the inventive text-yourself service, users do not need to remember a shortcode number for a particular service, nor does a service provider need to acquire and use a shortcode nor communicate that number to prospective customers. Users can subscribe to many services through a unified text-yourself subscription method, and they do not need to learn how to text in a way that is notably different from normal practices. Texting yourself can be used to activate a host of real-world controls and, by including a keyword in a text message to a friend, a real gift or service can be sent.

The various aspects of the invention as outlined in the appended claims can be implemented as a hardware solution or as software.

BRIEF DESCRIPTION OF THE DRAWINGS

Exemplary embodiments of the present invention will now be described with reference to the accompanying drawings in which.

DETAILED DESCRIPTION OF A PREFERRED EMBODIMENT

Figure 1:
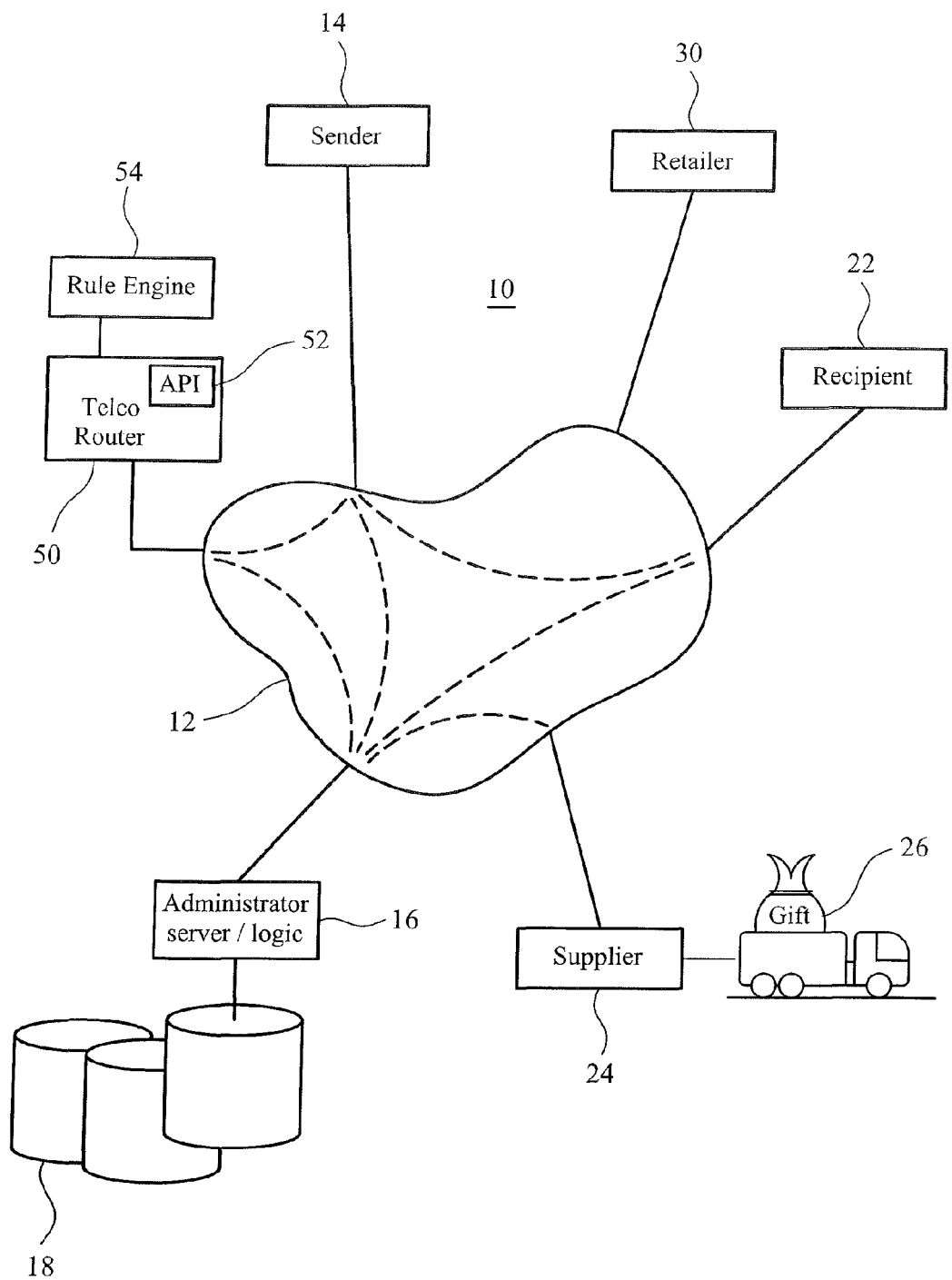
FIG. 1 is a network architecture that supports multiple operating methodologies for various gift delivery and messaging processes of multiple embodiments of the present invention.

FIG. 1 is a network architecture 10 that supports multiple operating methodologies for various gift delivery and messaging processes of multiple embodiments of the present invention.

Based around a network 12 that may employ wireless and/or wireline data transfers at different times or consequential of overall network topography, a first device 14, such as a networked computer or a smartphone, is connected through the network 12 to an administrator 16. The first device 14 can therefore be considered to be one of many and a "sender" of an order instruction. The first device does not need to be a smartphone and could, in fact, be a functionally limited cellphone or similar telecommunications device having a basic keyboard and display.

The administrator 16, such as a server, is coupled to a database 18 that stores account data, including mapping of unique virtual identities registered to an account and recipient physical address data. Indeed, the database 18 may include multiple virtual identities to each physical address. The administrator 16 is operative to manage accounts and orchestrate delivery of gifts ordered against a registered user account from the sender 14. The administrator 16 therefore contains a processor and control logic, whereby processor and control logic are arranged to register new accounts, maintain and map existing account identities and physical addresses and to resolve trigger events received from the sender 14 to initiate messaging and, eventually, bring about delivery of goods or services to a recipient 22. The administrator 16 therefore acts as a human machine interface (HMI) allowing a user to place an order (such as via an SMS or email sent through the network 12), whereafter the control logic in the administrator 16 is tasked with fulfilment of the order and engagement of a supplier 24 (again typically through an instruction sent through suitable interface protocols used by the network 12). The administrator 16 may therefore be realised as a web server.

The supplier 24, upon being contacted (such as via an email instruction), can then arrange delivery of any ordered gift 26 to the recipient 22.

Establishment of an Account

Figure 2:
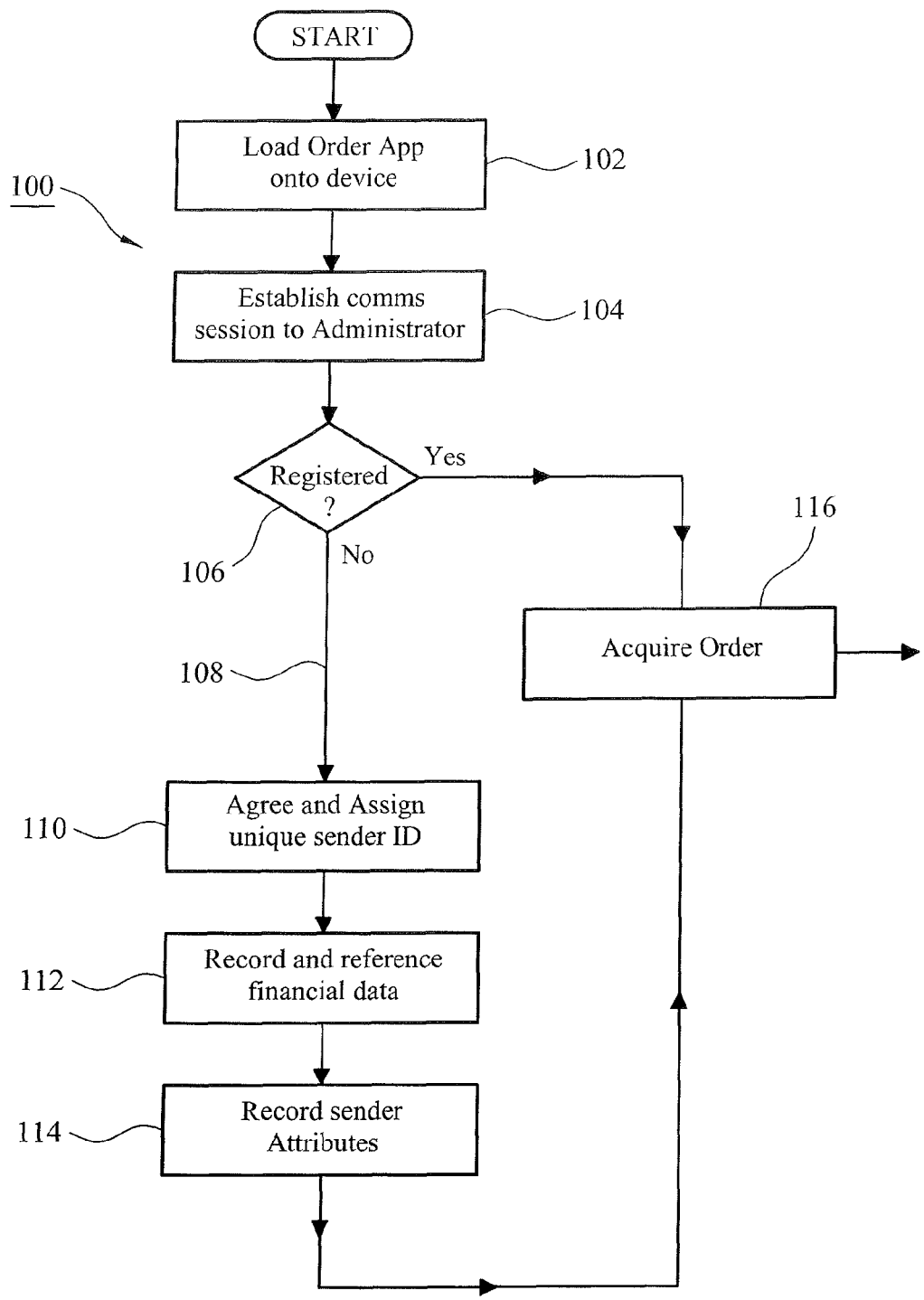
FIG. 2 is a flow diagram of a preferred registration process.

Referring to the flow diagram of FIG. 2, an account set-up process 100 is shown.

In the context of a mobile device based sender 14, the sender initially loads 102 a gift ordering and delivery application ("OrderApp") into memory of the mobile device for execution by the mobile device's processors. The OrderApp (which could also be based on a web browser) provides a human machine interface and, through a data connection, an access point to a management system (such as a web site) of the administrator 16. As indicated above, once registered, the sender 14 is able to place orders that are serviced and fulfilled by the control logic at the administrator 16.

The mobile device may be a smartphone or other communication device, including a computer. The mobile device therefore provides an access portal to the administrator, as will be understood. The recipient device does not need to be a smartphone.

Upon instantiation of the OrderApp, a communication session 104 is established (via one or more networks 12) with the administrator 16. If not previously registered (decision block 106), the sender registers 108 with the administrator by providing 112 financial account details against which charges for products can be made and, furthermore, settles 110 a unique sender identity that is recorded in the database 18. It is preferable that, from the outset, the financial account details are cross-referenced against the unique identity so as to facilitate ease of ordering and minimal authentication in any sender-to-administrator contact. The unique sender identity is, however, generally tied to and recorded against the mobile device address or phone number and could, subject to access, simply be a unique SIM card number or an IP address or social networking identity that is sent automatically to the administrator 16 upon establishment of a call. Alternatively, the unique sender identity could be a log-in name that is easy to remember by the sender and which log-in name is entered by the sender and sent in an uplink message to the administrator to permit opening of the relevant sender account. The sender identity can, in fact, be any authenticable virtual identity.

With the sender account open and active, the sender may place 116 an order for a gift, such as a bunch of flowers or a box of chocolates (by way of limited example to a physical gift or supplied service). The sender 14, however, does not need to identify a physical address for any recipient 22. Instead, the sender 14 is required merely to identify the recipient to allow the administrator 16 to contact the recipient 22 and effect delivery of an ordered gift 26. The sender's account may include a variety of acquired and recorded 114 sender attributes that can be used as tags in a message to authenticate origin, e.g. the attributes may include (but are not limited to) the sender's physical address, cellphone and/or landline telephone number. The sender's account may typically also include an agreed security password or code that is used for authentication purposes to verify that the remote sender 14 is who they say they are.

In the event that the recipient has not previously been registered in the database 18 by the administrator, a messaging and delivery process proceeds in one of two ways, but regardless of the selected one of the two alternative ways there are always two messages initially communicated to the a new recipient: (1) a first personal message that is delivered directly by, or seemingly delivered from, the sender 14 to the recipient 22; and (2) a short code or message expressly sent by the administrator 16.

There is both an indirect and a direct route for sending the first person message; the choice is generally subject to national telecommunication standards.

Indirect Route and First Contact

The indirect route operates in the following fashion and with reference to FIG. 3.

Figure 3:
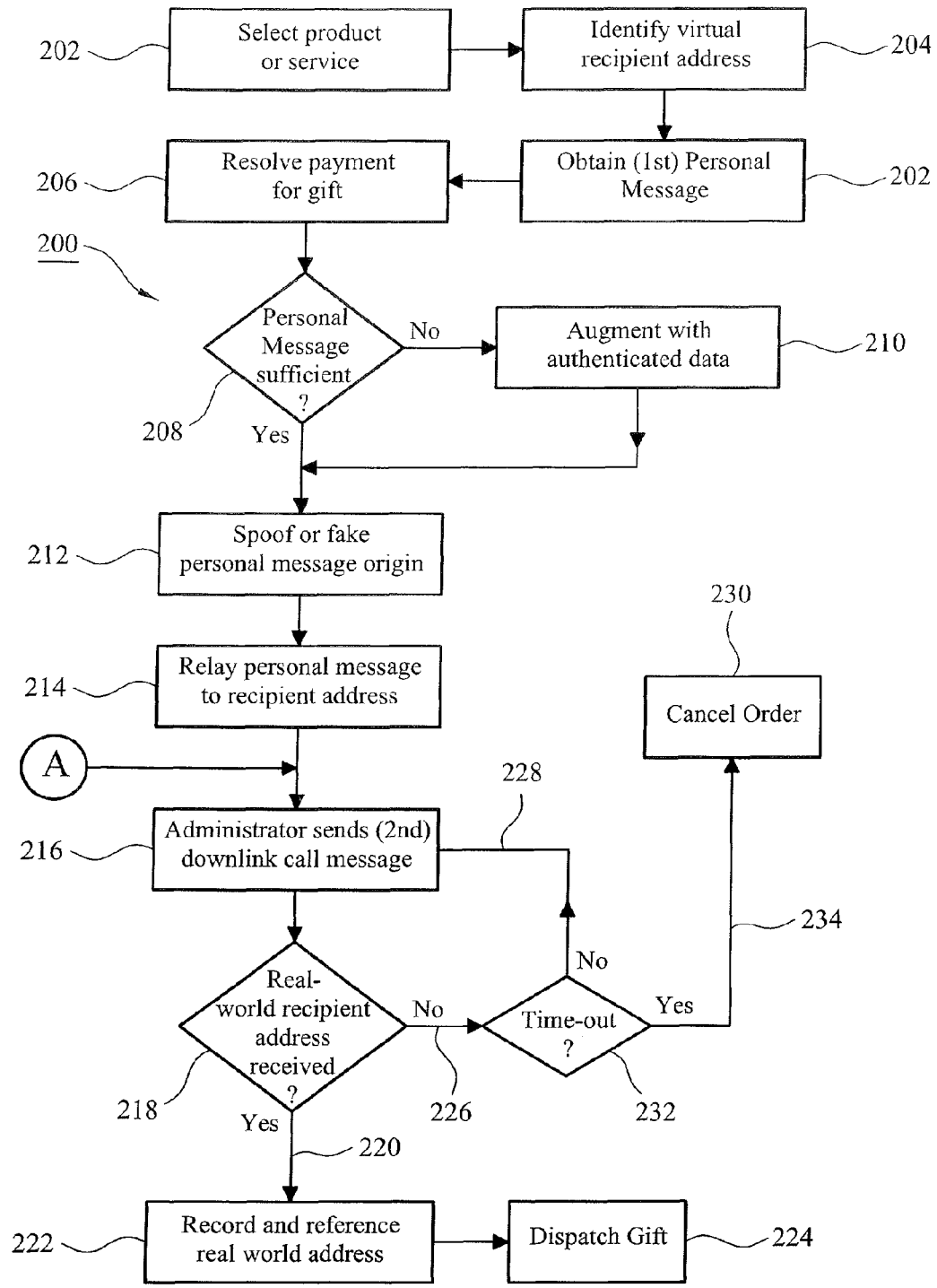
FIG. 3 is a flow process, implemented within the network of FIG. 1, of a preferred gift delivery service based on indirect message routing to a recipient.

FIG. 3 is a flow diagram of a preferred gift delivery process 200 based on an indirect message routing to a recipient The sender 14 instantiates the OrderApp and selects 200 a product or service for delivery. The OrderApp allows the user to enter 202 a personal message intended for the recipient, which message is then communicated to the administrator 16. Contemporaneously, the sender 14 also selects and then effects an order for a particular gift 26 since the personal message relates to gift delivery. Indeed, the order will require some form of monetary transaction to be managed and completed 206 by the administrator. Additionally, the order requires the sender to identify and communicate to the administrator a virtual contact address 204 of the recipient, e.g. an authenticated cellphone or landline number. In establishing contact to the administrator 16, the sender 14 is explicitly and uniquely identified to the administrator, e.g. through the use of the unique sender identity.

Upon receipt by the administrator 16 of the personal message and the virtual contact address, the administrator operates to relay 210 the personal message in a downlink personal message to the recipient's virtual contact address. However, the act of relaying the downlink message "spoofs", i.e. fakes, the originating address (such as by replicating the message header) so that, from the recipient perspective, the personal message is understood/seen to have come directly from the sender 14 rather than being routed through or sent from the administrator 16. Spoofing or faking the downlink personal message is typically and optionally augmented with a notification that says, in essence, that the recipient 22 has been sent a gift 26 by the sender and that the recipient 22 will be subsequently contacted by the administrator 16 in a second independent message asking for delivery details. The "spoofing" of faking of the originator address by the administrator therefore engenders a level of trust at the recipient given that the recipient not only receives a personalised message from the sender 14 but also that, seemingly, the personalised message has source credentials that tie back to the sender's physical address, authenticated cellphone and/or landline telephone number. Source credentials that are recovered from the sender's account can be populated into the relayed personal message or as meta data into the relayed downlink personal message, with this process optional and potentially required, as will be understood, should the original uplink personal message from the sender be insufficient (decision block 208) by including only a password or partially obscured sender identity. The administrator 16 may therefore be configured to augment 210 the original personal message by 'filling in the gaps' in the downlink personal message so that the recipient can glean a level of confidence that the message is not spam, but rather a genuine attempt to provide a real-world gift 'without any strings attached'. The administrator's control logic is therefore configured to populate the downlink message with authenticated data and in accordance with rules established at the set-up of the administrator's function.

With the header spoofed or faked 212, the personal message can then be sent 214 in its original (sufficient) form or otherwise in an augmented form.

Spoofing or faking therefore permits the intended recipient to infer that the personal message associated with the intended gift has indeed been sent from the sender 14 (and not an unknown third party). Spoofing therefore brings about an ability to attribute a message data field (e.g. a sender's CallerID) with the origin sender, rather than the relay point. Increased levels of trust mean that higher proportions of gifts will be claimed by the identified recipients.

After relaying the downlink personal message, the administrator independently operates to send 216 a second downlink call message to the recipient. The downlink call message is sent to the recipient's virtual contact address as provided by the sender. The downlink call message includes a gift or sender reference (whether visible or invisible to the user) that cross references to the sender's gift order and/or account.

On a first order to a particular recipient, the administrator logic needs to acquire 218 a response to the downlink call message sent to the intended recipient.

Preferably, the downlink call message expressly refers to the previously communicated downlink personal message so as to establish a visible association between the administrator 16 and the sender 14 and their gift 26. The downlink call message asks that the recipient reply to the downlink call message to claim the gift and thereby to supply a physical address to be used as an actual, real-world delivery address for the gift 26. The nature of the uplink reply can take a number of forms, but need to include the gift or sender reference to ensure that the control logic at the administrator can resolve the delivery address against a specific order. For example, a direct reply in a text message is one option for the uplink reply, but equally the reply could be via another communication platform, such as an email or a telephone call.

Once the administrator receives 220 the recipient's real-world delivery address in the uplink reply, the administrator 16 is configured to manage 222 the response and subsequently arrange 224 dispatch of the gift 26. The point of dispatch may be used to trigger a status update on the delivery of the gift, and this status update can be sent to one or both of the sender 14 and/or the recipient 22.

If no response is received 226 from the intended recipient, the administrator may again try 228 to contact the intended recipient by re-sending the downlink call message or otherwise the administrator may optionally cancel 230 the order after a time-out 232 (such as a fixed number of contact attempts or an absolute length of time) has expired 234.

Registered Recipient

Figure 4:
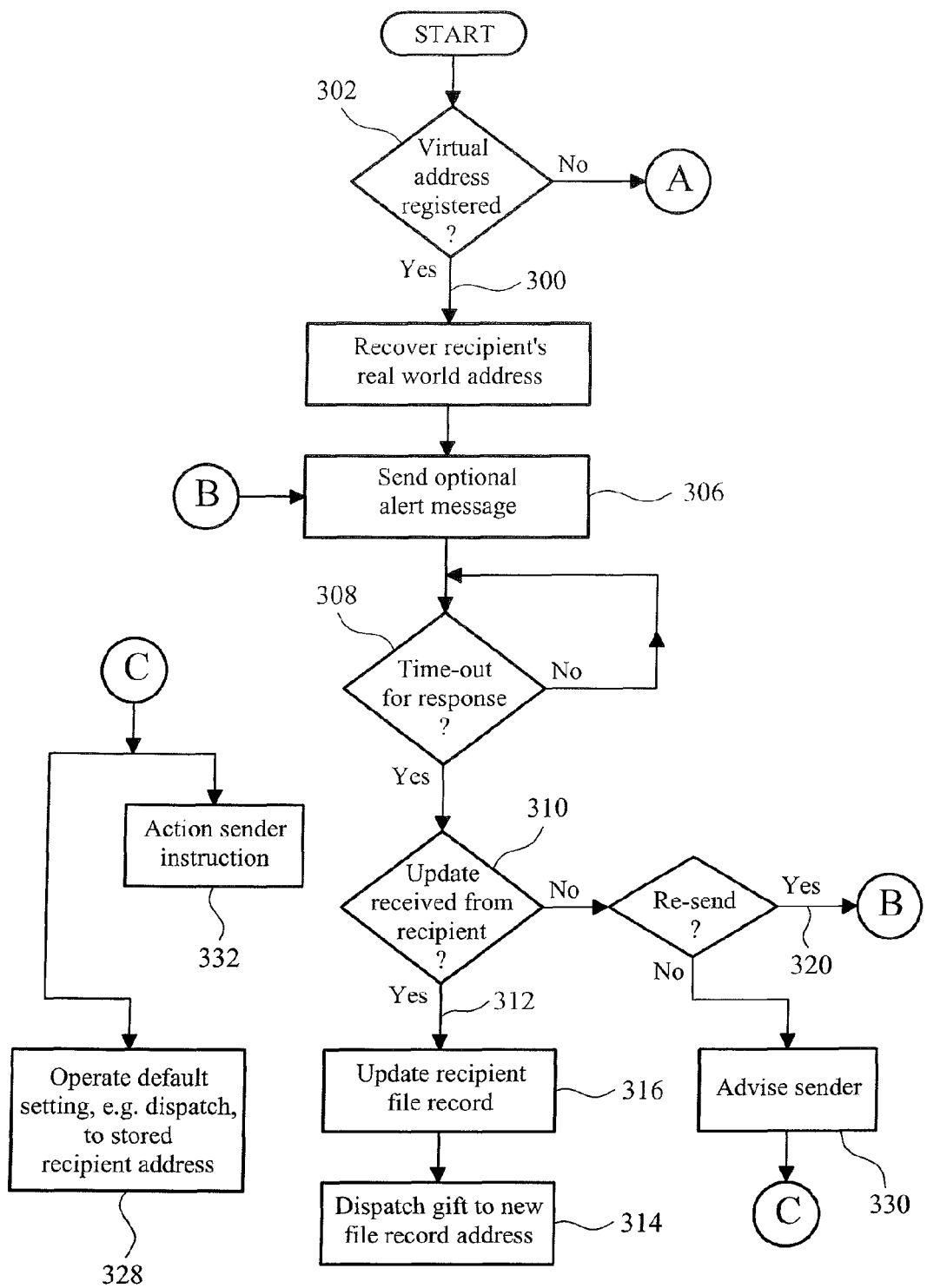
FIG. 4 is a flow process showing a preferred gift delivery process for a registered recipient.

The administrator 16 is configured to operate to associate and record (step 222 of FIG. 3) in its database the real-world delivery address against the virtual address of the recipient, thereby establishing a registered recipient in the database 18. The cross-referencing between the virtual address and the real-world delivery address of the recipient can be used (affirmative route 300 from decision block 302) subsequently to negate the requirement to send the downlink call message at the point of a subsequent order to the same recipient and regardless of whether the subsequent gift is from a common sender 14 or someone entirely different. The administrator is therefore arranged automatically to manage any sender order (FIG. 4) to a known registered recipient and to oversee sending 304 of the gift 26 to the physical address of the recipient. Expressing this differently, the database's recipient record supports the automatic reference to an existing physical address and the automatic delivery of gifts to be sent to the recipient's physical address without intervention by (or with) the sender 14 or the recipient 22.

Of course, the administrator 16 may continue (306) to send alert messages concerning subsequent gifts, with these alerts now received from the administrator acting in the capacity of a "known" source with whom the recipient has had previous and successful and legitimized interactions. Any alert messages from the administrator to the recipient's virtual address also permit the recipient to respond 308-310 and update 312 a physical address to which a (subsequent) new gift can be delivered 314 and this update can be aided by intelligent administrator rules to remind recipients when a delivery address change might occur. The administrator can, in response to a reply to the alert, therefore update 316 its internal database by replacing an existing real world recipient address with an updated real-world recipient address.

A registered recipient may also access the administrator and have the virtual address expunged or otherwise the cross-referenced physical address (related to the recipient's virtual address) changed or updated in the database 18.

The database 18 may include many virtual addresses mapped to a single physical address.

The registered recipient is therefore not tied to the originating sender responsible for sending the first gift to the recipient. Also, from a security perspective, the sender 14 never needs to know the real-world physical address of the recipient and, moreover, the recipient can prevent someone registering a physical address against a virtual identity given that only both are known to the recipient. The secure nature of the database 18 and the administrator therefore prevent direct release of the recipient's virtual identity and the physical real-world address. And any changes to the physical address (as mapped to the virtual recipient address in the database 18) are irrelevant to any sender, with the update in the registered recipient record occurring seamlessly without any sender's knowledge or action.

The OrderApp may, furthermore, provide access to the database 18 to allow a sender to select a gift (such as an offered service) for delivery to a virtual identity selected from a universe or otherwise subset or limited sorted subset of digitally-stored virtual addresses; this is particularly valuable in a marketing context. By way of explanation, subscription or enrolment data sometimes contains limited personal information that, following owner consent, is subsequently made available to affiliate companies. A company or organization may therefore base a marketing campaign on a selected demographic profile selected as relevant to the marketing interests of the company or organization. To incur the costs associated with providing a sample for testing or appraisal purposes, the company therefore need only identify itself (for reasons of engendering trust) and select virtual addresses to which the sample is potentially to be sent. The company is therefore not exposed to delivery costs for samples that may, in fact, be immediately discarded if physically delivered, since the recipient is responsible for providing their real world delivery address in response to an offer to supply and the sample is only sent after a positive from a virtual address. The recipient is furthermore protected from physical "junk mail" since the initial company approach/offer is not directly to a physical address.

In summary, to receive a gift, the recipient does not need to pre-register for the service, since their physical address is only subsequently obtained and stored against their virtual address which is communicated in an order. However, once the recipient has responded to the downlink call message, the recipient is effectively registered and therefore recognizable by the system.

Failure of Recipient to Respond

Should the intended recipient not respond within a predetermined period, then the administrator may optionally re-send (320) the downlink call message to solicit a response, or otherwise dispatch 328 the gift to the stored recipient address; the choice is down to the control logic and system set-up.

In the event that there is no reply after a predetermined number of attempts or a time out, the administrator may send 330 an automated message to the sender advising of "no contact" and requesting further instructions. These further instructions may take the form of a refund (less any administrative charge), a credit against a future order to be recorded against the client account or a new instruction to contact a new virtual address with a view to delivery of the gift to a physical address ultimately mapped to the new virtual address. The further instructions may be a default setting written into the administrator's control logic, or otherwise may be based on explicit sender instructions 332.

In a preferred embodiment, the administrator (at time out) can be configured to send a notification saying that the gift will be dispatched to the post code (or partially obscured physical address, e.g, 183, STREET: xxxspring drive, TOWN_ _ _field, ZIP Code_A 1, 2_) should the administrator fail to receive a response within, say, 6 hours from the time of sending the reminder or the downlink call message. The administrator therefore provides the recipient with an option to reply.

Sender Authentication

In advance of the administrator releasing an instruction to deliver a gift, the administrator may be configured to undertake a sender authentication. The process ensures that a third party cannot impersonate a sender and thereby send a gift to a recipient when posing as the sender. Putting this differently, the authentication process acts to prevent the recipient believing that the gift was sent by person X (when in fact the gift was sent by person Y).

Authentication generally occurs at a point after the sender's order has been processed and a related financial transaction has been cleared by the administrator 16. Of course, authentication can occur at different time, including contemporaneously with (or in) an uplink communication that accompanies the personal message and the virtual contact communicated to the administrator 16.

The purpose of authentication is to ensure that the sender is who it/they purport to be.

In one exemplary authentication process, the administrator buffers the sender's order instruction in the sender's account and only releases the instruction to deliver the gift once a messaging handshake conveys a predetermined password or access code, i.e. once an authenticated handshake takes place. For example, in response to the order, the administrator may return a short code related to the specific order to the sender's registered number of the sender's smartphone (as obtained from the sender's account), with the sender then tasked with replying to the short code to confirm that the order is legitimate. Alternatively, the sender may be required to enter an authentication code in advance of the order being made or after the order is made; this may be a pre-set password at the point of order or at a point of challenge.

The Direct Contact Process and First Contact

Figure 5:
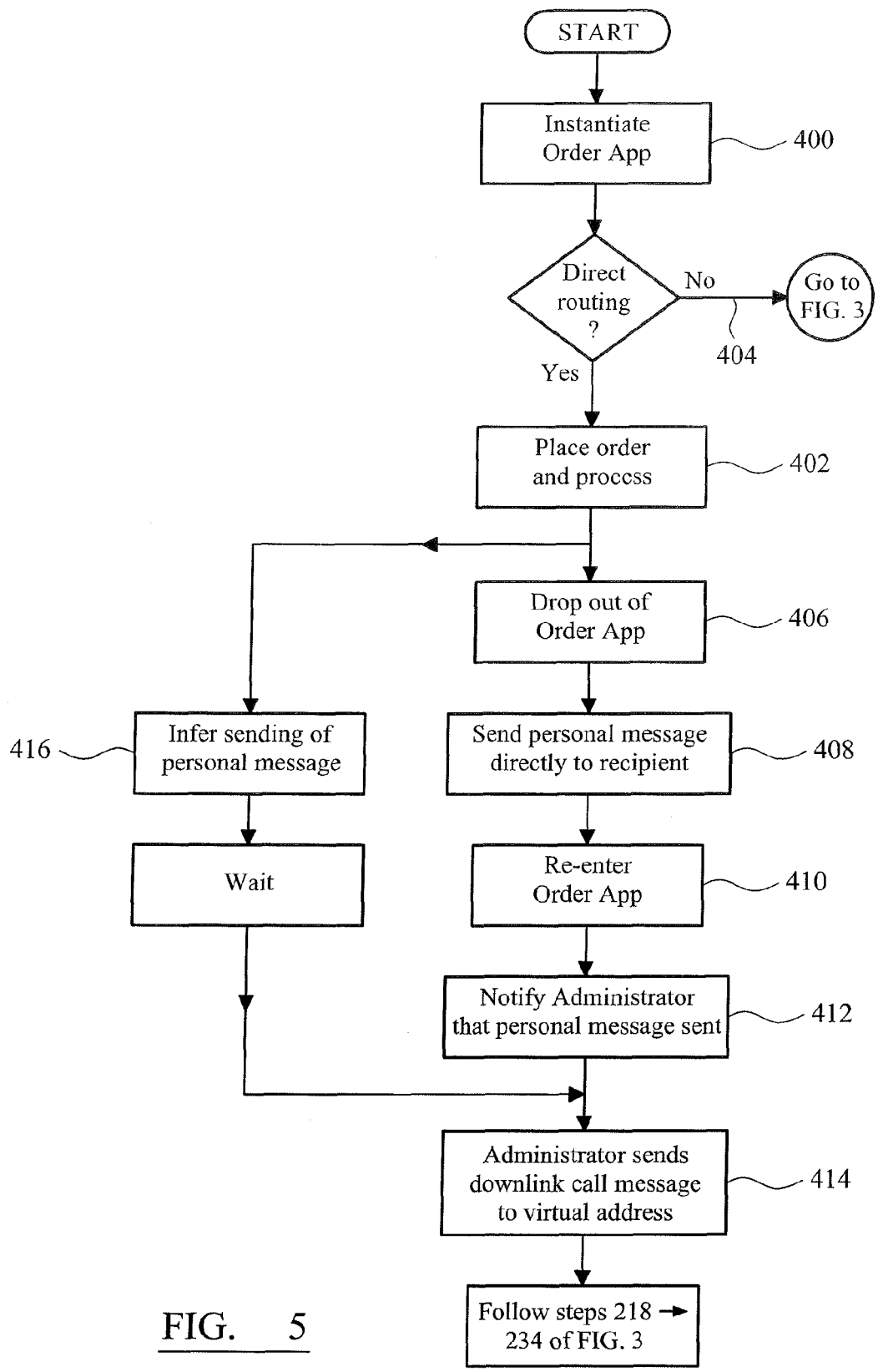
FIG. 5 is a flow process, implemented within the network of FIG. 1, of a preferred gift delivery service based on direct message routing to a recipient.

FIG. 5 is a flow process, implemented within the network of FIG. 1, of a preferred gift delivery service based on direct message routing to a recipient.

In contrast with the indirect process, the direct contact process operates a modified contact regime to the intended recipient but nevertheless still requires two messages to be sent, namely: i) a direct personal message (as opposed to a spoofed or faked indirect personal message) and ii) the second downlink call message (described above).

The process again begins with the instantiation 400 of the OrderApp and the placing of the order 402 against the unique sender identity. However, rather than to route the personal message to the administrator and then "spoof" or fake the header (in the "indirect" approach of FIG. 3—path 402 from decision block 404), the sender's smartphone temporarily drops out 406 of the OrderApp and sends 408 the personal message directly to the virtual address of the intended recipient. Returning 410 to the OrderApp, the administrator is made aware 412 that the personal message has been sent, with this contact from the sender 14 then allowing the administrator to send 414 the second downlink call message to the recipient's virtual address (which is in any event sent to the administrator 16). The act of placing the order through the administrator can, in fact, infer 416 that direct contact will be made by the sender to the recipient within a short period of time.

Sending the second downlink call message earlier than the first personal message is possible, but there is a chance that the message timing would cause the recipient 22 to ignore the second downlink call message by treating it as spurious or spam.

Registration and fulfillment of delivery of the gift then follows the process outlined above, including the steps of (in no particular order): authentication of the sender; receipt of the uplink reply notifying the administrator of the recipient's real-world delivery address; registration of the recipient (if needed); follow-up in the event that the administrator does not receive the expected uplink reply. The administrator can resolve delivery to the recipient based, preferably, on the recipient receiving and then quoting to the administrator the sender's unique identity. Other mechanisms for closing the loop and resolving a specific sender order against a specific virtual identity of a recipient may also be employed, including inference based on relative message event sequencing and the administrator resolving that the sender has identified the specific virtual identity and the recipient has responded to the administrator from the specific virtual identity.

The direct process is employed in territories where indirect routing and header spoofing or faking are objectionable. However, the net effect achieved by both the indirect and direct processes is the same, namely that (1) a sender is able to send a gift to a virtual address without knowledge of the physical real-world address of the recipient and (2) the recipient is able to receive a gift without having proactively to pre-register with the administrator. In the latter respect, the initial contact with the recipient is reactive, although future contact to and delivery of goods to the recipient does not require any form of response from the recipient. Indeed, with any subsequent delivery of a gift, even the personal message can be omitted, although sending of a personal message to the recipient is preferably because that personal message always points the recipient to an originator (i.e. the sender 14) of the gift.

Subsequent Orders to a Registered Recipient

Once a gift associated with a first order has been dispatched and the recipient registered in the database 18, the process of messaging and delivery can be simplified for subsequent orders. More specifically, although personal messages are preferably always sent (either directly or indirectly) to forewarn a recipient to expect a gift 26, the sender 14 merely needs to notify the administrator of the gift and the virtual address of the recipient, whereafter the administrator 16 can identify the physical delivery address (associated with the intended recipient) from its database 18 and then send the gift 26. Indeed, dispatch could occur without any attempt by the administrator to contact the intended recipient in a secondary message, although it is preferable that the recipient be notified by use of the downlink call message (described above) so as to allow the recipient to change its physical address for delivery.

However, as one option, a personal message sent by the sender may also act as a warning and a recipient may subsequently respond directly to the administrator in order to release the ordered gift by replying, e.g. sending a linked SMS message, to the administrator saying "yes, I've received a direct personal message, so please use my registered address" or "no, please update your delivery records to new address #STREET NAME, TOWN, STATE, ZIP CODE". This contrast with the preferred system arrangement where the administrator sends a secondary message that solicits a response to implied acceptance from the identified recipient.

Applications for Text Ordering

Applications for text someone else include the ability of the sender to send, for example, a variety of goods including: i) flowers; ii) real or eBooks; iii) vouchers; iv) authorise a PSMS payment; v) text someone a gift bought from an online retailer or marketplace, such as Amazon® and eBay®, using a product item identity (same for eBay and other commerce providers); vi) trigger a Skype VoIP call using an existing Skype account; vii) divert a text message through a cheaper channel instead of the default mobile network operator; viii) send money to another mobile device.

Voice Gift Messaging

As a variant to a text-based personal message, another embodiment makes use of a recording facility at the administrator 16. At the point of placing an order, the sender 14 provides a sound bite that is recorded against the sender account and recipient's virtual contact address for that order. The sound bite is then relayed in a message to the intended recipient by the administrator 16, with the recipient acquiring a higher level of assurance from recognition of the sender's voice and/or message content. The message may be augmented by a supplementary message (pre-prepared by the administrator and stored in the database 18) that provides a verbal instruction detailing how the gift can be obtained. The voice messaging may occur at the point of first contact to a new recipient or at any other time with a registered recipient.

Voice gift messaging can therefore follow the flow paths outlined in FIGS. 3 to 6, albeit that the personal message is a voice message.

Indeed, voice ordering may be practised within the system so as to permit ordering of a gift to a virtual address through a more limited landline phone. In this respect, a landline call is established from the sender 14 to the administrator, with the sender then providing—in a preferred case reciting—the virtual contact address details for the recipient, the sender's unique identity and the personal message in response to verbal prompts. Some data entry may optionally be via DTMF touchtone codes (or the like) and the use of the telephone keypad. In a fully automated arrangement, the recited information is subjected to voice recognition processing to permit control logic at the administrator to extract salient information required for addressing and order completion. In contrast, the personal message is simply recorded for timely packaged delivery to the recipient.

To claim a gift that is notified by a voice message, the recipient authenticates who they are and the real world delivery address. The recipient would therefore respond to the voice message, such as through a text, voice recognition or web-based instruction.

Intermediate Company Ping

The system of FIG. 1 may further include one or more retailers 30 connected into the network 12. These retailers offer online goods and services, typically via a web browser.

The system can be further adapted such that a sender 14 interacts with the administrator through an intermediate third party retail website. In this instance, the third party retail website is augmented with a "ping" purchase button, with the sender 14 interacting with administrator-based software accessed through a portal of the retail website. More specifically, the sender 14 establishes a secure account via the retail website to permit financial transactions to be completed at and by the administrator's servers. The retail website therefore provides an embedded "use" portal in its proprietary website that seamlessly links to the administrator's management system that operates to set up the initial order or transaction and then functions to administer account payment/settlement and resolve real world delivery addresses.

At the point of completion of an online order, the sender elects the "ping" purchase that permits the sender to generate a personal message and for that message to be routed to the intended recipient by the administrator's server. The retail website therefore acts as a window to what is available, with the administrator concluding the sales transaction and arranging dispatch and delivery to a real world address. Any order received and processed by the administrator's system intelligence is inherently linked to the particular retailer web site.

In a similar fashion described above, the sender 14 uploads a virtual contact address (such as an email account name or cellphone number) to the administrator's server via the presented web portal controlled by retailer's web server, which web server then acts to relay the personal message to the virtual contact address. This relaying preferably includes spoofing or faking of the sender's identity so that assurance can be obtained by the recipient. Of course, the spoofing of the header is optional and the personal message may be relayed directly from the sender to the recipient to say, in effect, "I've ordered you a gift from the Retailer website ABC. You'll be contacted by "Parcel Genie", the administrator 16, in a second independent email or message that requests delivery address details. Please let them, know where you'd like the gift delivered".

Selection of the "ping" purchase also acts as a trigger establishment of a communication session between the web server of the retailer and the administrator, with the communication session permitting the administrator to acquire information pertaining to at least the retailer and the virtual contact address of the recipient, but preferably also details concerning the identity of the gift and/or the identity of the sender 14.

Armed with the virtual contact address of the recipient, the administrator operates to establish a downlink call message to the recipient that requests the recipient to return a real-world physical address detail for where the gift is to be sent. The administrator 16, upon receipt of the physical address, stores the relationship between the virtual address and physical address (as described above for potential future use) and notifies the retailer web server that a completed order is ready; this is typically achieved through the administrator providing a suitably enabled application program interface. Once the retail server is notified of the order, the delivery details (including the physical address) are passed to and injected into the retailer's proprietary order processing system. The retailer's web server can then complete the order by dispatching the ordered gift directly to the recipient.

Again, with the retailer or sender knowing the recipient's physical address, a product or service can be delivered to the recipient physical address.

Subsequent order progress as described above. Similarly, subsequent orders may be subject to the sender authentication process described above as well as the failure/recovery mechanism that requires confirmation by the recipient that any registered physical address remains a viable and usable delivery address.

Text Yourself Ordering and Text Message Gifting

Figure 6A:
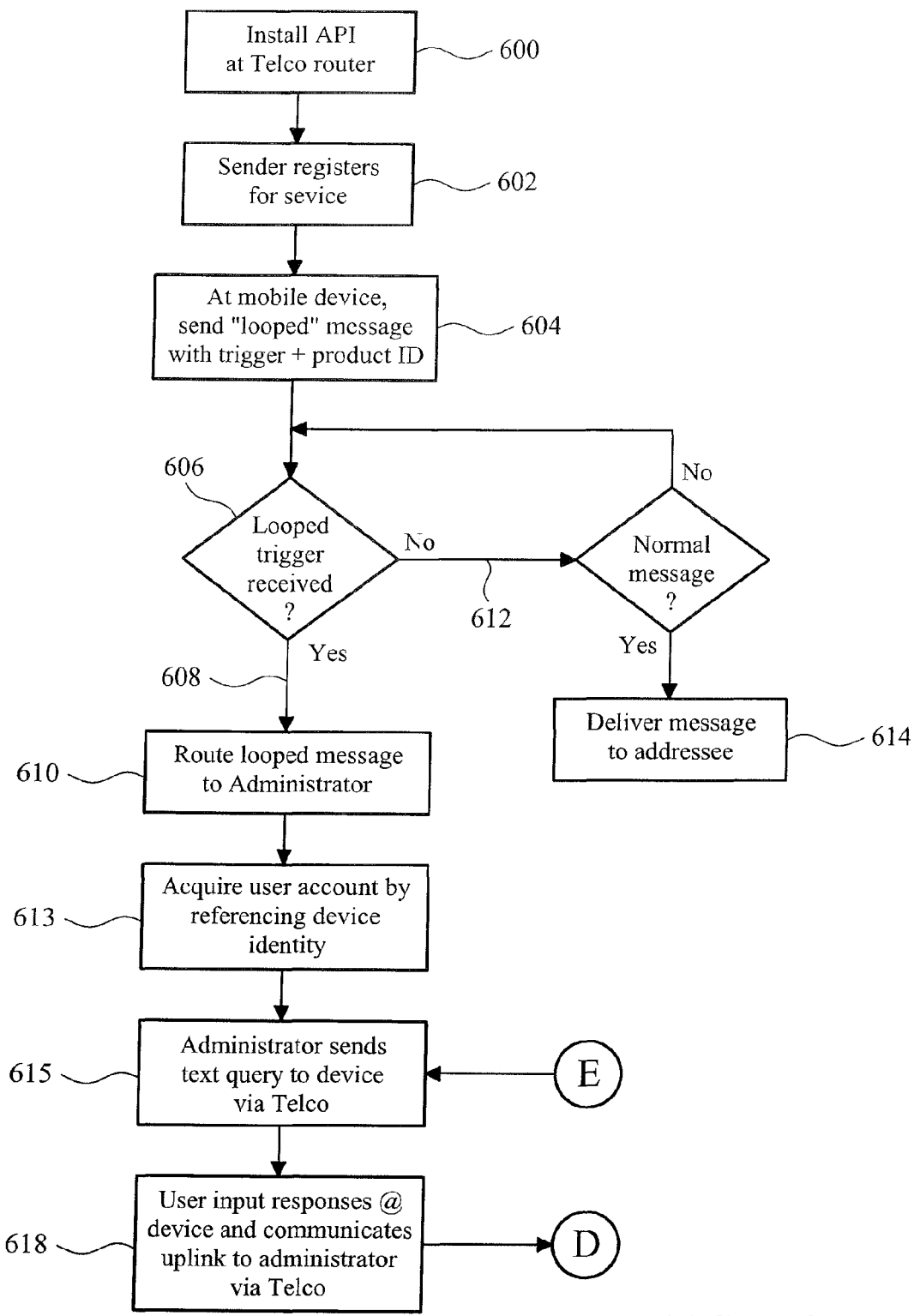
FIGS. 6a and 6b collectively represent a flow process through a "text-yourself" ordering methodology according to another aspect of the invention.
Figure 6B:
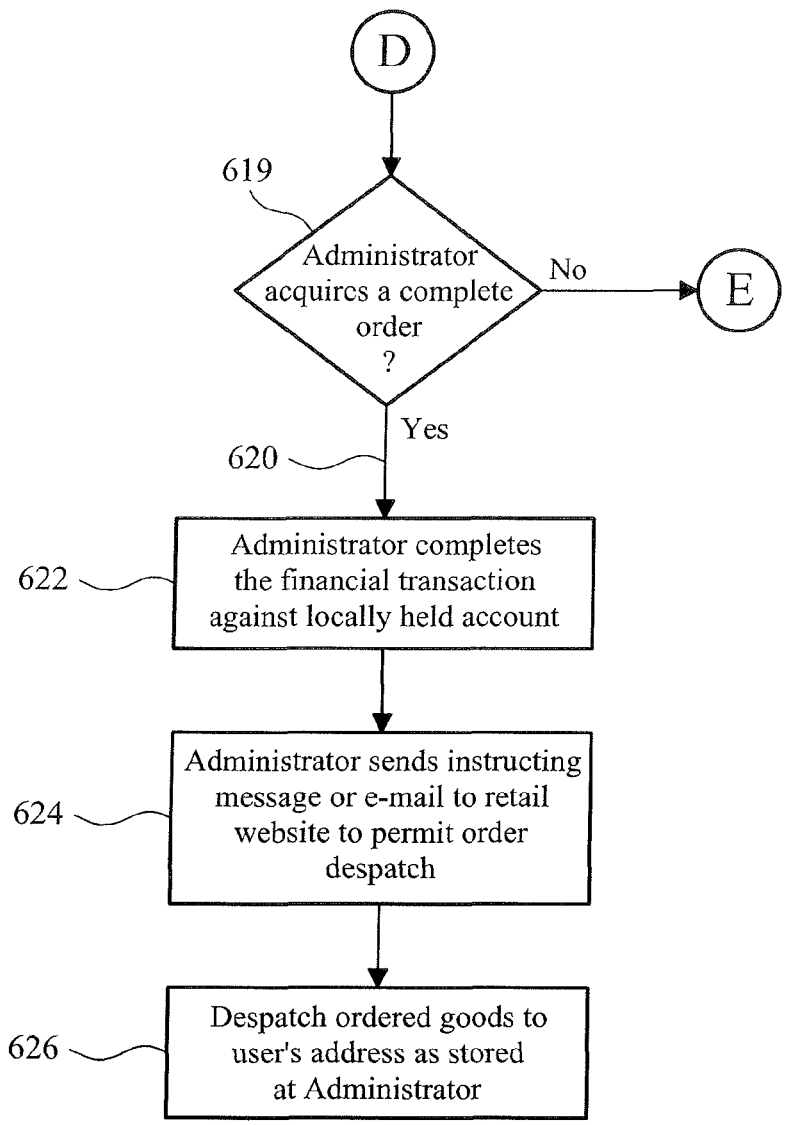

In another aspect of the invention that can operate in a complementary or independent sense to the gift messaging in which the sender has no knowledge of the physical address of the recipient, the administrator is configured to operate, for example, as a virtual clearing house for a financial transaction or as a coordinator for a marketing promotion or other service requiring no payment. FIGS. 6a and 6b collectively represent a flow process through a "text-yourself" ordering methodology according this different aspect of the invention.

Advantageously, preferred embodiments of text yourself ordering and text message gifting do not require the use of dedicated software, such as an App, installed on a phone because the order and any confirmatory dialogue is conducted through an existing messaging network and protocol, such as SMS.

The nature of the communication session can, in fact, also make use of proprietary communication protocols, such as the iMessage service offered by the iPhone®, rather than to use text messaging services conventionally supported by interacting infrastructure platforms provided by mobile network operators. iMessage and equivalent technologies use internet-protocol (IP) packet communications, with embodiments of preferred embodiments using any of these equivalent forms a "chat" messaging to support the service triggering network response and/or triggering content. Given that any initial trigger command (used by intelligence in the communication path to recognize the requirement for the service and to instantiate the service) is entered typically by keystrokes on a mobile phone, this entry can be intercepted and interpreted to invoke point-to-point communication with an administrator (or retailer) over, for example, a packet-based wireless network supporting internet protocol. The following description of the text yourself ordering and text message gifting aspects of this invention should therefore be understood as being readily adaptable to make use of SMS messaging and equivalent messaging protocols, such as IP-based systems based on interception of an initial uplink message at either the phone or network/SMSc level.

Unless a specific and more limited interpretation is required by the surrounding context, the term "text messaging" will be understood to describe text-based communication protocols, including conventional SMS-messaging and equivalent IP-based systems (or the like) that make use of proprietary protocols.

Briefly referring to FIG. 1, it is noted that the system 10 may include a Telco router 50 that administers telephone calls and text messaging, with the telco router 50 coupled to the network 12. Installed 600 on the telco router 50 is an application program interface ("API") that executes control logic to administer, respond to and process SMS messages (and the like) received from the sender 14. The Telco router 50 is therefore connected to a rule engine 54 that cooperates with the API 52, and which rule engine 54 contains a modifiable instruction set that defines telco interactions as well as limited sender-related data. The sender-related data pertains, for example, to the identities of registered system users who have subscribed to the text ordering and text message gifting services described below.

One of the issues with connection to an administrator 16 is that data security generally demands that some form of log-in code is provided by the sender to verify access and appropriateness of the communication session. However, it is not unusual for a sender to have many log-in codes for different accounts and for the sender to forget a particular log-in. This aspect of the invention allows the sender to approach purchase of goods or services in a different fashion.

At the outset, the sender 14 accesses the API 52 and preferably registers 602 for a "text yourself" or "text message gifting" ordering service; this registration is stored in the rule engine against the sender's unique phone number. The sender then sends 604 a text message that conventionally is routed via the Telco router 50.

The API 52 and rule engine 54 cooperate 606 to capture text messages that have a common "looped" sender and recipient number, with the API 52 (i.e. the control intelligence in the router 50) inspecting the content of the text message (or functionally equivalent, e.g. MMS) against pre-defined rules in the rule engine. The objective of the inspection is to look for and identify 608 stored trigger words or trigger images within the message, e.g. "buy for me", and if these are present then selectively to pass 610 the message to the administrator 16 for further processing and acquisition of an order for goods or a service. If the looped message is not assessed (path 612) to contain the trigger, the API 52 steps back from the interception and interpretation procedures and functions to forward 614 the message to the intended addressees.

An identified looped message provides a process, firstly, that mitigates the use of a log-in since the sender is authenticated through having replied to the shortcode verification request or has entered the code sent to them via their mobile number. Secondly, if interpreted by the API (having regard to rules in the rule engine 54) as a self-order, the API routes the message to the administrator 16 for additional support in the securing of the product or service against the sender's account.

To implement this ordering scheme, efficiency requires pre-registration of the user.

In more detail, an initial text message from the sender 14 contains a field that identifies a product code and includes the trigger word, trigger phrase or passcode. At the router, an embedded intelligence, such as realised by an API, reacts to the incoming SMS messages containing the looped back address. The API therefore operates to resolve 606 the intent of the looped addressing by responding to a trigger word, trigger phrase or password and setting up an appropriate call to the administrator 16. In that call, the initial text message is communicated 610, with the administrator further referencing 613 its database to acquire an understanding of the sender's registered account.

The administrator 16 may be configured to respond 615 to the initial text message (routed via the telco router 50) to acquire more information about the nature of the product or service to be ordered, including the name of the retailer or supplier. As necessary, the sender 14 will consequently provide 616 one or more additional text responses to the administrator to permit the API to acquire a detailed understanding of the order and to permit the administrator to complete the order with the retailer and to debit the sender's account held in the database 18 coupled to the administrator 16. This dialogue excludes the sender's sent message being returned to them as a normal text message delivery. The message path to the administrator is identified through the header information conventionally included in the initial text message and the reply; this process is readily understood.

Once the administrator has acquired 618-620 a complete order, a financial transaction can be managed 622 by the administrator against the sender's account and an instructing 624 message or email can be communicated directly to the server of the retailer to permit the retailer to dispatch 626 the goods or services to the physical address logged against the sender and stored in the database 18.

In text gift messaging, the sender loops the address back to himself, with the router interpreting the looped message as an "order", especially when the message has a content field that includes a trigger word or phrase. The trigger word, for example, means that the message is passed on to the server of the administrator where the order can be processed. As the name suggests, the process invokes delivery of a gift using the processes of, for example, FIG. 3 in combination with the access strategy of FIGS. 6a and 6b.

The administrator's server may need to operate a multiple interrogation process based on the level of content in the initial or subsequent messages. For example, the initial message may simply include the word "buybyphone" (or some other trigger) to instantiate the application. However, in itself, this is insufficient to identify the recipient or product, although any pre-registration process may associate the cellphone number against a stored account and for financial recharging purposes. The interrogation, which is preferably SMS based and therefore routed to the administrator via the Telco router and usually the SMSc, then seeks confirmation (over one or more steps) about the nature of the gift and who is it for. For example, the interrogation and interaction may follow the exemplary path of:
i) Identify third party virtual address (for "text gift messaging"), or confirm that order is personal to the sender (for "text yourself ordering");
ii) What's the product or service? e.g. product QR code, captured image and/or description:
SMS response from sender, such as "Bristol Temple Meads Station Car Park, 2 hour parking".
iii) Is it this product [supply image or description]?
A verification response from the subscriber/sender may be required if the suggested product is subject to any form of search. The qualifying verification response typically is achieved, as will be understood from the totality of the disclosure herein, using a message-based question and answer ("dialogue") session conducted between the product/service provider and typically the ordering sender, although the recipient is equally well placed to define particular requirements and preferences for the ordered goods or service, e.g. 'please order size 42" regular for [the already stipulated] overcoat design EZ007/13'. It's also possible to make use of artificial intelligence techniques, such as Natural Language Processing, at the receiving server to reduce the number of interactions needed to establish the intent of the user. Messages will make use of a conventional message path through an SMSc (or the like) in a similar fashion to the process used to establish the real-world address from the supplied virtual address. Clearly, individual messaging to a virtual address (to establish a real world address for the recipient and alert the recipient of the third party order) is optional and will generally not be required because the recipient is unlikely to require a separate and individual message to placate potential self-fears about the message being fraudulent or spam.
iv) Confirm point of purchase, e.g. shop name.
SMS response from sender.

Preferably, goods or service identifiers are stored on databases accessible to the administrator server 16, with these goods or service identifiers communicated from the sender (i.e. the ordering party) to the vendor's server (via an SMS controller) to identify a required product or service to be ordered. Furthermore, goods or service identifiers are stored and cross-referenced against a particular retailer. The identity of a required product or service may, however, also be inferred or determined from a data scrape against a particular price or location communicated in the uplink message, but this inference-based process increases the possibility for error. Inference may make use of metadata in the uplink message or network routing information attached to the message as the message is communicated uplink from the user's HMI/MMI, e.g. a phone-based user interface ("UI").

The goods or service identifiers are therefore product level identifier codes that may, if necessary, trigger additional dialogue with the sender to allow confirmation of the desired product or dialogue with the recipient's virtual address to allow settlement and eventual confirmation of the recipient's real-world address and/or other important/critical order-related information, e.g. dress size or quantity of an identified designer shirt.

The vendor may be a high-street retailer that need not, but preferably has, an on-line ordering system. The vendor may be addressed directly or accessed via a specialist intermediate administrator server—reference numeral 16 in FIG. 1—run by a management company that is tasked to manage the text-message service and to provide any necessary API to bring about seamless integration and communications between the registered user, the SMS controller ("SMSc") and the retailer's server. This particular arrangement is shown in FIG. 1, although it will be understood that the administrator server 16 may be collated with the retailer and indeed run by the retailer. More generally, the administrator server is independent of the vendor since this simplifies contractual negotiations and set-up with a mobile network operator (MNO) that owns or leases the base telecom infrastructure, such as the SMSc.

For registration to the text-based ordering service to occur, the sender (or, more aptly and interchangeably, the "buyer" in the case of text yourself messaging/ordering) initially sends an SMS message, i.e. any suitable electronic message supporting data content, to the SMSc (or its functional router equivalent). Upon receipt at the SMSc, the SMS message is recognized as falling into a service category that requires different processing and specific onward routing. The SMSc is therefore configured to communicate the SMS message to a server finally tasked to service the SMS message and any content.

The use of a self-addressed format is preferable because it engenders trust from the buyer. Also, any self-addressed message requires no knowledge of an address that supports the service, and furthermore removes doubt about whether the initial message was correctly received using an address that was potentially only remembered by the sender. The looped back nature of the self-addressed message also allays potential concern about third party access to and third party use of the uplink message since (1) the looped message is dealt with by conventional network infrastructure operated by a regulated network operator and (2) the message is not subjected to remote processing on a third party server that is adjunct to the regulated network infrastructure.

Using SMS messaging as an exemplary model, the SMS message will preferably be structured by the sender to include some form of predefined vendor-level code, i.e. a unique vendor-identifying code such as #retailer_name, to reflect the fact that the buyer wishes to register for on-line purchases with a particular retailer cross-referenced to the inserted predefined code. Each vendor-identifying code will therefore typically include a keyword or a code unique to the vendor, with the vendor-identifying code allowing onward routing from the SMSc to an appropriate server. As indicated above, the server may be an administration server or a retailer's server, but in either case at servers (individual or collectively) configured to run code that registers the user and ultimately provides order fulfillment and deliverables (whether goods or services).

If the initial registration request is simply a self-addressed SMS without a vendor-level code, then the SMSc might be configured to recognize that this looped message is a trigger for registration to a Text Yourself Service administered by an external administrator. Again, this may result in the looped message being communicated to an external administration server 16 tasked with progressing registration of the user to one or more offered services provided by one or more specific vendors. The SMSc therefore requires minimal adaption, e.g. use of a routing table that communicates the self-addressed looped message to the centralised address of a networked administration server 16 (or other server tasked with progressing registration of the buyer). Registration of the buyer to the service is then conducted independently of basic SMSc operations, but overseen by the connected administration server that is discrete from (and generally physically remote to) the SMSc. This will require qualifying messaging dialogue to be sent back to the user's phone via an SMSc since the looped message may not in itself be sufficient to engage a retailer or administrator for registration in the service.

As will be understood by the skilled addressee, it is possible to send messages back to the user either directly through the SMSc or via an SMSc Gateway service, as commonly provided by companies such as OpenMarket or mBlox. The use of an SMSc gateway service can therefore be implemented with any of the embodiments described herein.

If registration is progressed through a specific intermediate administration server (i.e. reference numeral 16 of FIG. 1) that is distinct to and commercially independent of a retailer server, then this administration server realizes an aggregation interface through a one-to-many mapping between respectively the SMSc and servers of goods retailers or other service providers. This configuration makes roll-out of the service significantly easier by having the administrator server support a plurality of vendor-specific interfaces, whilst keeping SMSc functionality and software substantially unchanged from conventional SMSc configurations.

The SMSc can base a registration request on at least one of (and preferably both of) two parts of the uplink message, namely i) a common sender and recipient address/number in the SMS message; and/or ii) a specific, valid vendor-level code contained in the SMS message and cross-checkable against a listing of current stored vendor level codes for vendors subscribing to the ordering service.

The initial registration may occur simultaneously with the first order (subject to content), but may also be an independent process conducted earlier than the message containing the first order instruction.

Alternatively, increased complexity can be added to the SMSc to support service registration. In this particular instance, a looped self-addressed SMS causes the SMSc to establish a dialogue with the buyer to obtain the name of the retailer or service provider with whom the user wishes to register. Once garnered with the name of the retailer or service provider, the SMSc can then progress the registration process through, for example, the processes outlined above to permit communication of future self-addressed messages to an identified service that is offered by an identified retailer or service provider.

Registration of the buyer into the text yourself service therefore renders the SMSc transparent to the buyer and allows the buyer to engage, in a seamless way, with the retailer or service provider to secure goods and/or services. Receipt of ordered goods or services is settled through SMS messaging that appears to be point-to-point between the buyer and the retailer/service provider.

In the context of text message gifting, it will now be understood the SMSc (of the mobile network operator) is configured to process any received self-addressed text message by initiating a registration activity or, more usually, by communicating the self-addressed text message to a remote dedicated server supporting text-yourself ordering or a text-message gifting service. The commonly used address and sender fields therefore act as a trigger mechanism for altering the routing and processing of content fields in the message, with the content field preferably including a confirmatory trigger word or code, such as "self-gift" confirming the requirement to instantiate, for example, the text message gifting process or registration for that service. In other words, the SMSc must at a minimum recognize how to deal with a self-addressed "looped" order message and then either interpret the message (to some extent) or otherwise communicate the message onwards to a third party device logically equipped to resolve the detail in the self-addressed order message. The latter scenario is preferred because the level of programming change in the SMSc is minimal, with external servers managing service-subscription and order data independently of (and remote to) the SMSc.

By referencing a look-up table, the SMSc control logic—typically an installed piece of control software realizing an application-program interface, API—may be configured to resolve whether the vendor-level code in the message corresponds either to a valid code for a remote vendor-related server or a vendor to which the sending mobile is affiliated/subscribed. The look-up table may be collated with the SMSc or remotely accessible in an offsite database.

In one embodiment, provided that a valid vendor-level code is present and identifiable in a self-addressed message, the SMS is communicated onwards to the corresponding retailer/service provider for order-processing. Alternatively, the SMSc routes the self-addressed message to an administration server based on a valid registration entry in a routing table.

In the event that the code within the self-addressed message is invalid or no pre-existing registration can be found to effect routing of the message to a text-yourself ordering server, then the SMSc may be simply tasked to communicate the message onward to the recipients identified in the destination address of the message.

Upon first receipt of a routed SMS message at a vendor's server (or the administration server as may be in the alternative), the SMS message is parsed to permit recovery and storage of the buyer's address in a look-up table at the vendor. The vendor's server (or the administration server as may be in the alternative) may then send a registration acknowledgement back to the SMSc for storage/update of any local look-up table for future routing of self-addressed messages.

The vendor's server can now automatically establish a dialogue with the buyer to confirm, for example, credit and payment details; this can be conducted through conventional messaging. The vendor's server will therefore typically further include program code that supports payment systems, including registering a PayPal® account or a credit card against a mobile number through web access and registering a credit card against a mobile number through a voice call. The registration process with the buyer operates to set-up an account at the vendor's server, with the account both providing a mechanism to ship ordered goods/services according to the buyer's future instructions and a mechanism through which the vendor may receive payment.

If registration has already taken place, the routing of the self-addressed message occurs in a transparent fashion with respect to the SMSc. The vendor's server—typically accessed via the administration server 16—can then process the order or otherwise dialogue with the buyer through a suitable messaging protocol. The dialogue may make use of a proprietary messaging service, such as Blackberry® Messenger, or otherwise may be conventionally supported such as in the case of SMS messaging through an MNO.

In certain instances, it is possible for the sender to be registered with multiple retailers that may use a common identifier for a product, for example a barcode that is supplied by the original product supplier (such as an OEM). The SMSc logic can therefore be set up to require that any product code parsed from the content field in any self-addressed message is subject to local validation in a look-up table and, if present, a dialogue established with the sender to confirm which registered vendor account is to be used. For example, the sender might send the product code #Sweet123, with the SMSc control logical resolving that the Sweet123 code is a recognized, i.e. stored, code offered by two different retail chains to which the sender is subscribed. The SMSc would, in this instance, need to construct a dialogue that resolves which one of the two registered retailers is to receive the order (through the onward relay of the received SMS message).

If only a single registration existed to retail chain "X", the decision could be implied and the SMS message communicated onward without further interrogation of the sender. A further alternative would permit the SMSc to ask whether a generic product was to be sourced through a registered account, or otherwise through another retailer who is logged in the SMSc's look-up table as being a supplier of the product Sweet123. The latter case would require a registration process, as outlined above and herein, to be completed to associate the sender with a registered account recorded by the newly selected retail chain "Z" An alternative is for an intermediary server to be used to direct traffic according to a user's pre-registered details, such as a stated preference, in the event that a single item or service exists across multiple retailers or service provider.

Of course, dialogue may be omitted in the event that the electronic order message, e.g. the content field of the self-addressed SMS message, is sufficiently detailed so as to permit resolution of an appropriate message path to the retailer and/or the requested product.

In terms of what message is sent to the vendor's server, this can take a number of alternate forms. Provided that the text message gifting protocol in recognized and instantiated for an uplink self-addressed message, the SMSc can: i) store and forward the communicated order request message; ii) simply pass the order request message to the vendor's server, whereby the SMSc acts merely as a transparent transfer portal; iii) operate to extract data from the order request message and then to re-package the extracted content into a vendor-stipulated message format that is then communicated to the vendor's server (either directly or via the administrator server 16); or (iv) to have the SMSc alert the server that a message and/or instruction is ready for processing, and then to permit that message to be pulled by the vendor or retailer's server for purposes of local processing. The preference, however, is to limit firmware/software changes in the SMSc to simply a routing operation and therefore to have the external retailer's or external service provider's server (or its proxy, i.e. administration server 16 of FIG. 1) interpret order instructions conveyed in the SMS message or other message format that instantiates the ordering service.

From the perspective of satisfying national legislation on the use of personal data, this can be addressed in the registration process by having the buyer accept terms and conditions of service usage that expressly permit the extraction of message data or the processing and/or communication of self-addressed messages to a third party.

Text Message Gifting and Message Interpretation at the Network Controller

In a further variant of the system, another aspect makes use of an active interpretation at the network controller (e.g. SMSc) of an incoming text message sent by a user of a device. This process is referred to as "text message gifting" and can be sent from a conventional mobile phone without feature phone or smartphone capabilities based on the architecture and messaging interactions 800 exemplified in FIG. 8.

The text message from a (pre-)registered user of the service is addressed to a user-identified third party recipient address. For example, the registered user 802 sends 804 a text message to one of their friends at a different mobile number. The text message includes a trigger word or phrase, e.g. a product level code or product name 806 such as "KitKat® chocolate bar". At receipt of the text message, the SMSc 808 cross-references a lookup table 810 (either locally or remotely maintained) to resolve 812 whether the sender is registered 814 for the "text message gifting" service. Cross referencing is possible because the text message conventionally includes a traceable address for the sender. If the sender is not registered (path 816) for the service, then the message is simply routed in a conventional fashion to the stipulated recipient address.

In the event that the user is registered 814, the SMSc can operate in one of two ways:

i) the SMSc itself looks at, i.e. investigates and assesses, the content of the message to identify the presence of the product level code. If a valid product level code is present), then the message is forwarded to an external third party server 818 for additional processing (and eventually resolution of a gift order instruction), otherwise the message is rejected and/or the sender accordingly notified about the content deficiency for the requested service. Processing makes use of control logic and lookup tables. The external third party server may by either a server of a retailer or service provider or otherwise the administrator server of FIG. 1 (that interfaces to the server of the retailer or service provider as explained herein). This configuration requires that the SMSc software be adapted and that the SMSc be kept up-to-date with respect to valid product codes.

ii) the SMSc simply passes (814) on a message (with the product code) received from a registered user to an external third party server 818, such as with the administrator server of FIG. 1 or server of a retailer or service provider, for processing. Control logic then investigates and assesses 820 whether a valid product level code is present 822 by typically referencing an up-to-date code look-up database containing a list of registered user and active product codes.

If there's no recognized active code, then the user enquiry (triggered by the text message) is rejected 826 and/or the sender accordingly notified about the content deficiency for the requested service. This external server configuration means that there is only a routing change at the SMSc, although routed message are now assessed by a third party that is outside of the security of the mobile network operator.

Figure 8A:
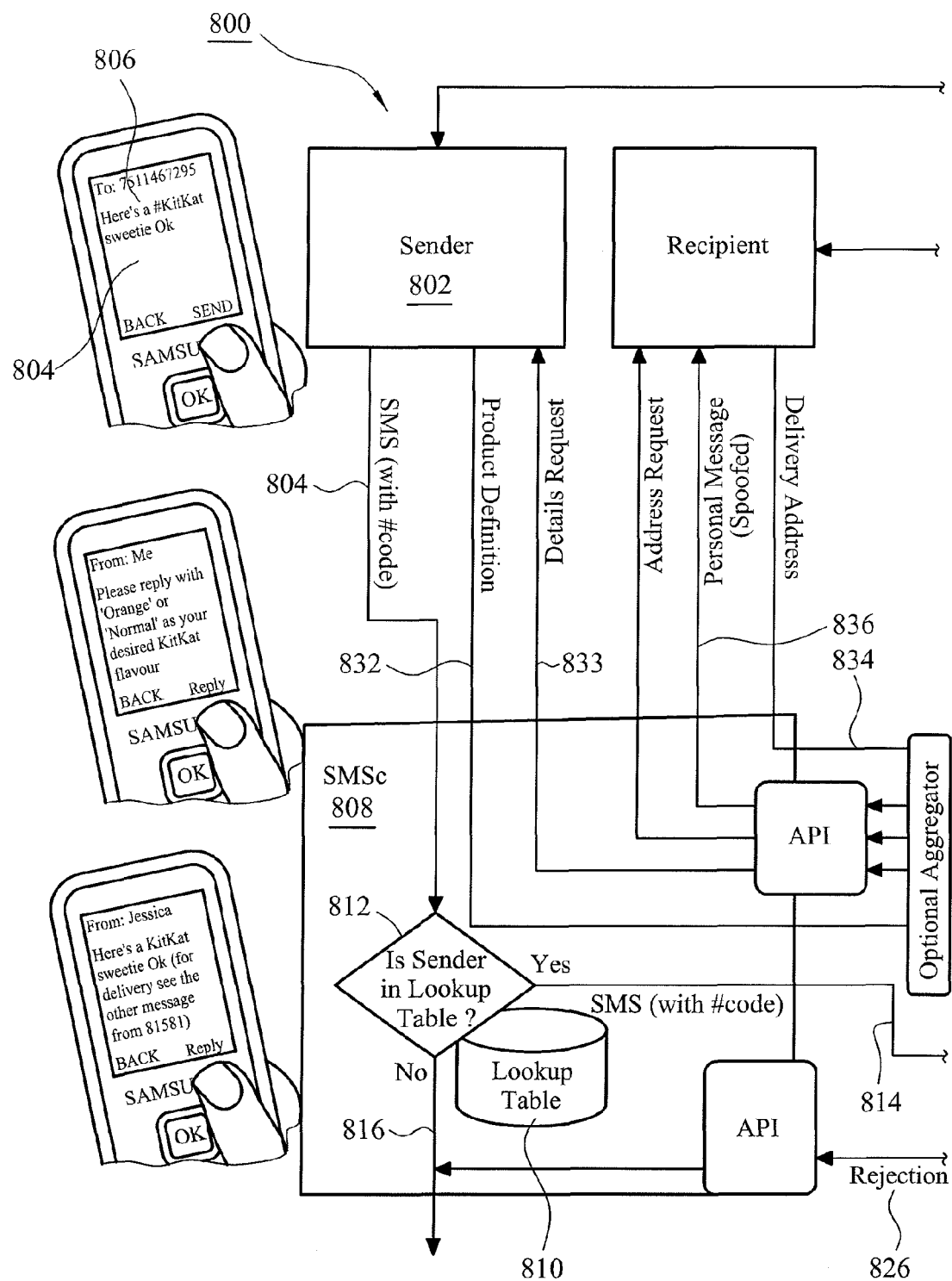
FIG. 8 is an interaction diagram showing preferred signalling interactions between a buyer and a service provider, the interactions resulting in the gifting of goods or services based on electronic messaging.
Figure 8B:
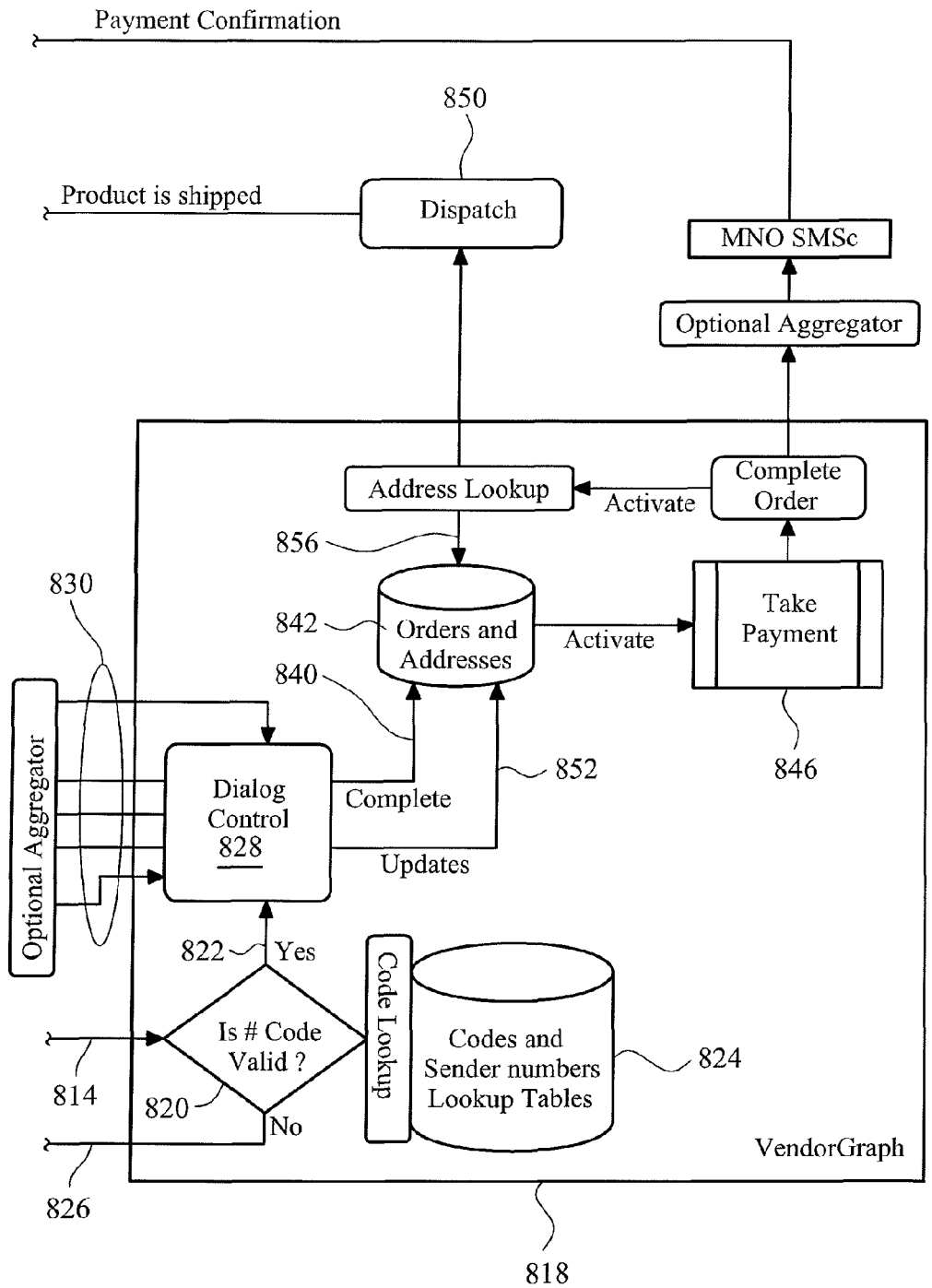

In FIG. 8, the code validation process is shown as being conducted outside of the SMSc 808. To allow the SMSc to be more involved in the processing, selected aspects of the control logic shown in the administrator server (termed "VendoGraph") are migrated into the SMSc's control system architecture—this may simply be computer program code.

In both scenarios, the text message is subjected to a parsing function by control logic at the third party server to the extent that the product code (or what purports to be a product code) is extracted. Control logic at the third party server assesses 820 the product code against currently active/valid product codes stored in an accessible database 824; the database is typically centrally maintained by the administrator server.

In the event that it is determined that an invalid product code is present, then control logic rejects the service request and provides a reporting failure message 826 back to the SMSc and, ultimately, the sending device. In contrast, in the presence of a valid product code, the control logic 828 optionally, and as necessary, interrogates at least one of the sender and the identified recipient through interactive text messaging dialogue 830. This interactive dialogue allows the control logic 828 to build a fuller picture of the order through one or more messages and one or more responses. For example, the dialogue can provide improved product definition through response clarification 832, confirm 833 that the order is correct and/or the real-world address information 834 of the recipient. In the latter respect, an administration server (acting as a go between with the retailer) may send a spoof message 836 to provide reassurance that the sender's intentions are genuine, with this process described above.

Once the order and delivery information is resolved 840 by the control logic, the control logic 842 is able to take payment 846 for the order through sender-provided banking details and finally to release 850 access to the product or service through contracting the retailer or service provider. As appropriate, the control logic will update 852 the sender and/or its own systems with order updates, including confirmation of order dispatch and/or debiting of the sender's account.

As has been said before, the administrator server is an optional but preferred intermediate system component that provides a point interface between the SMSc and multiple servers of vendors. The administrator server could therefore be subsumed into the retailer server functionality.

In overview of the text message gifting process, control logic is configured to interpret a trigger word or phrase within a body of an addressed text message sent by a registered user via a text messaging controller of a network. Once identified, the trigger word causes establishment of an interactive text messaging dialogue with either or both of: i) the registered user in order to resolve whether the registered user wishes to gift the product, identified by the trigger word or phrase, to a third party recipient identified by the address in the addressed text message originating with the sender; and/or ii) the third party recipient identified by the address in the addressed text message originating with the sender with a view to the control logic resolving a real world delivery address for a physical gift or physical service. Dispatch and order tracking function, for example, can then be conducted for system management purposes.

By way of example, a registered user may include the single trigger word "send" in a text message, which causes the service administrator to commence a dialogue and induce additional responses in the following general order:

1. Reg. User: "Send" [sent as payload content in a text message that invokes the service through its address header]
2. Admin: "What would you like to send?" [sent as text message direct to registered user's phone]
3. Reg. User: "KitKat" [dialogue response sent as payload in text message]
4. Admin: "Please include the number of the recipient to whom you wish to gift the KitKat" [sent as text message direct to registered user's phone]
5. Reg. User: "07715 123456" [dialogue response sent as payload in text message]
6. Admin: "Please conform you'd like to send a KitKat to 07813 123456" [sent as text message direct to registered user's phone].
7. Reg. User: "yes" [dialogue response sent as payload in text message]
8. Admin: "Great! Your transaction is complete and charged against your registered account details" [sent as text message direct to registered user's phone].

[KitKat is a registered trade mark of Nestle S.A. and relates to a biscuit-based chocolate bar available in (at least) the UK].

The system intelligence may, in fact, be configured to drill down from identified trigger words extracted from any response from a user. For example, if the response from the user is not a "yes" or "no" or otherwise fails to take on an accepted format, such as might occur if a nonsensical cellphone number "07" were mistakenly entered, the user system intelligence may recognize that the user response is generic and requires greater clarification. For example, the response from the registered user in step 3 immediately above may have been "chocolate", with the system intelligence either relying recorded past history for the user to suggest a "KitKat" or otherwise configured to send a list or some stockphrases soliciting clarification, e.g. "a) sweets or b) biscuit?". The registered user would then be allowed to correct the error or clarify their intention within the subsequent text message response. Equally, the system intelligence will look for key word triggers, communicated during dialogue, to correct the compiled order instruction or otherwise terminate the order. For example, the word "cancel" may terminate the interactive dialogue, with the system intelligence reporting (in a text message to the registered use):

6a Admin: "All incomplete transactions time-out after 15 minutes, but if you wish to cancel the transaction then please reply YES" "[sent as text message direct to registered user's phone following receipt of word "cancel" in uplink text message from registered user during interactive/drill down dialogue].

It is noted that holding a dialogue with the registered user (rather than the third party recipient) avoids potential privacy and data protection issues for any network operator and service administrator collaborating to support the text message ordering system as described herein). Validation of keywords and responses is achieved through sequenced interactive dialogue. Potentially, no dedicated onsite server is required by the network operator since a looped back interaction to the registered user is inherently secure as a consequence of resolving the point of initiation of any request as being with a particular and identified registered user and/or a particular and identified communications device, such as a standard cell phone or a smart phone. Indeed, messaging involving only the registered user can eliminate the need to repeat aspects of the message that otherwise must be relayed to provide context for any response. Moreover, once the service is engaged, network-side intelligence is preferably configured to curtail unnecessary routing of a self-addressed message back to the sending device.

In a particular embodiment, the gifting of goods or services from a registered user of the system could, in fact, identify the registered user themselves, i.e. the "gifting" is actually a gift to oneself and therefore, in effect, a direct self-purchase of goods or services via the text message gifting protocol described above. Putting this differently, in setting up the text message in this fashion, there is no independent "third party" recipient since the third party recipient is commonly the registered user who was responsible for initially compiling and sending the addressed text message. Text message interception and interpretation therefore supports a buying process from any device capable of sending a suitable text message into a communication network configured to relay text messages (irrespective of whether the message is structured to follow a proprietary format, e.g. Blackberry® Messenger, or otherwise assembled using a conventional SMS protocol).

Text Message Buying

Figure 7A:
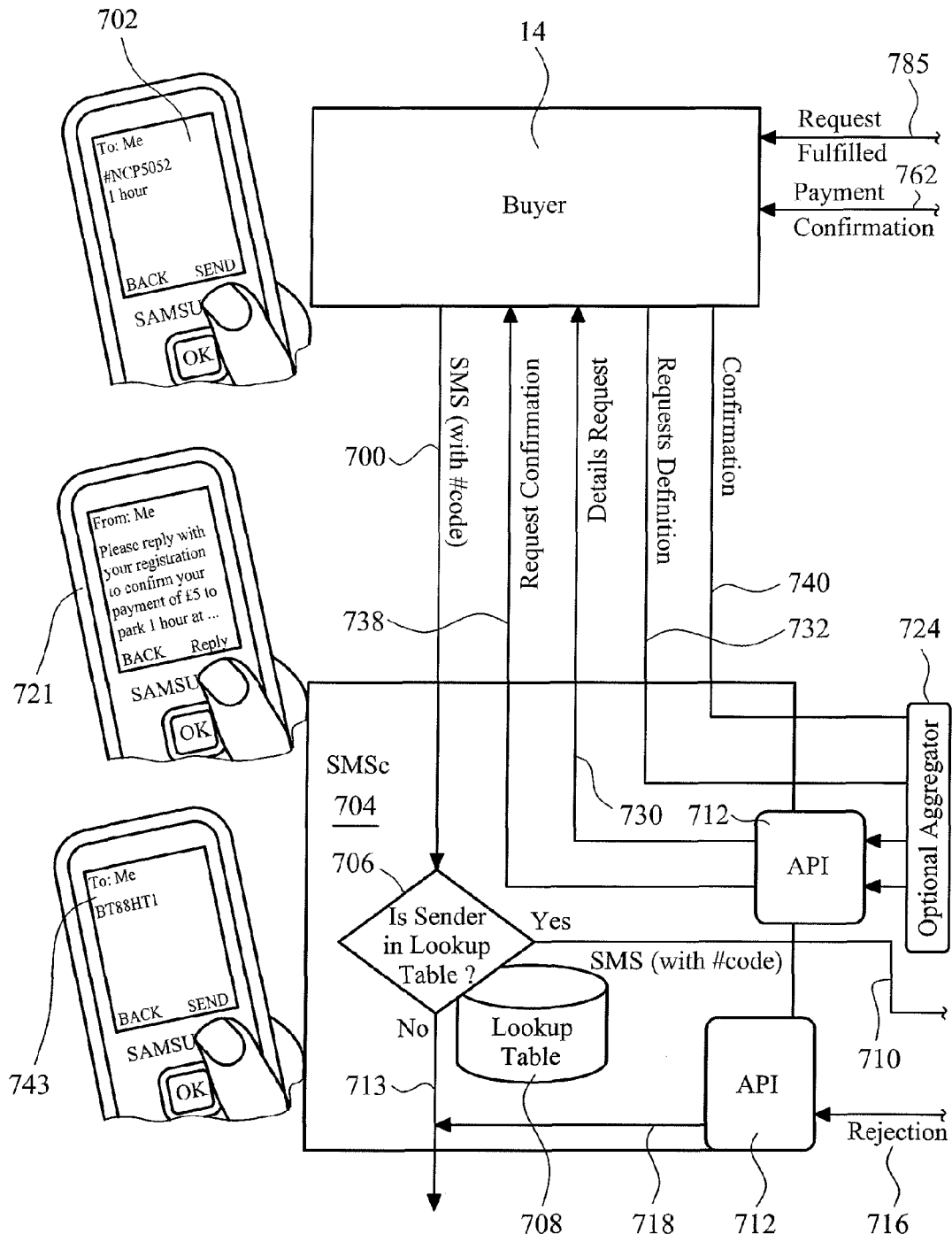
FIG. 7 is an interaction diagram showing preferred signalling interactions between a buyer and a service provider, the interactions resulting in the purchase of goods or services based on electronic messaging.
Figure 7B:
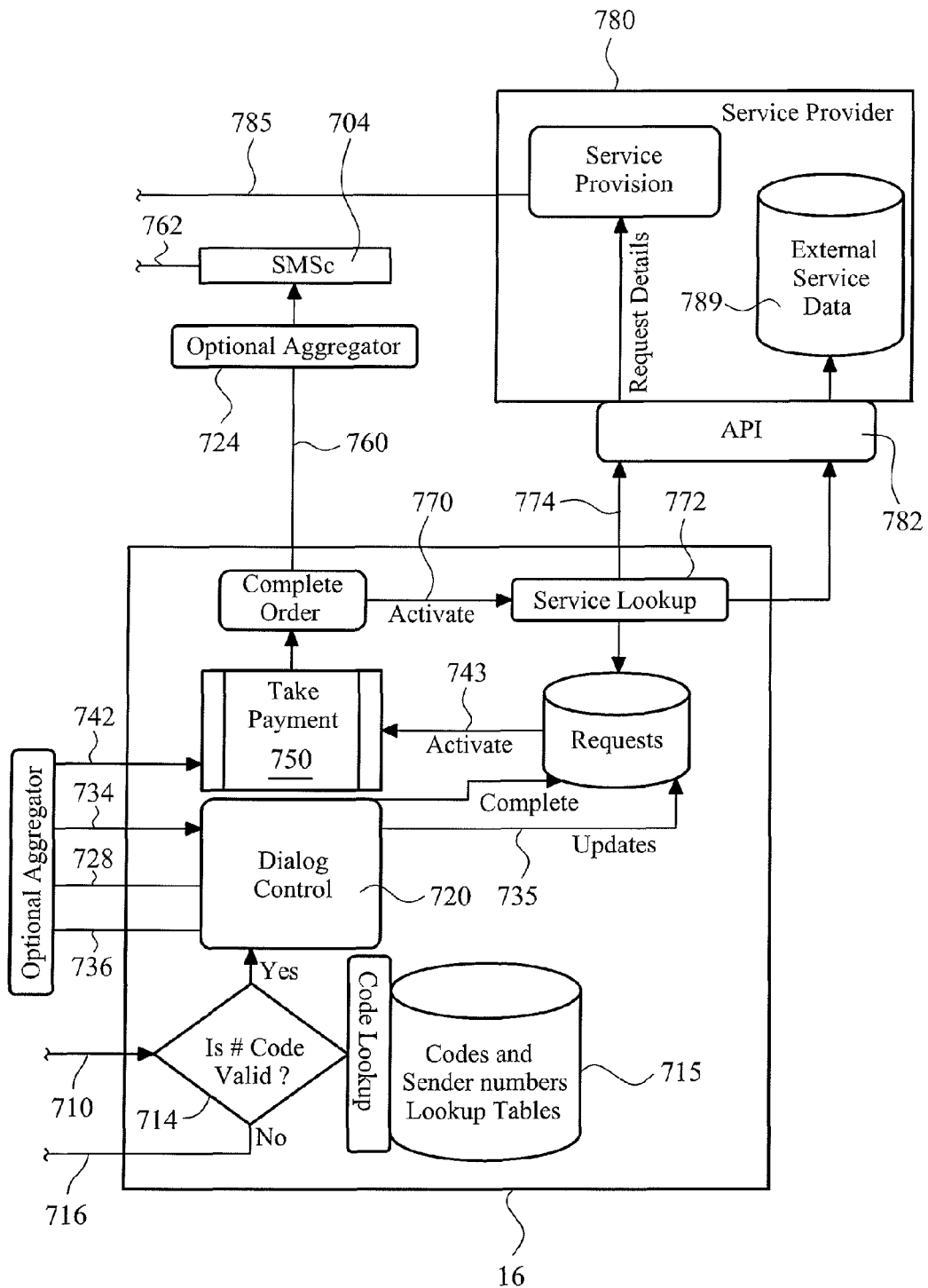

Turning to FIG. 7, there is shown an interaction diagram showing preferred signalling interactions between a buyer and a service provider, the interactions resulting in the purchase of goods or services based on electronic messaging. In this instance, the self-addressed SMS message and the personal nature of the transaction, i.e. the fact that the goods or services are provided to the originating sender (i.e. the buyer) of the message means that the system's backend infrastructure (typically the SMS controller, SMSc) does not need to send any form of secondary or "spoof" message.

To appreciate the process, the sender (more aptly the "buyer" in this case) sends 700 an electronic message, such as an SMS 702, to themselves. For example, this message might be the purchase of an hour of parking from a machine (identified as machine "5052") at a parking garage operated by a car park provider, e.g. NCP™. The SMS message 702 therefore includes an appropriate hash (#) or product code. The message is conventionally sent over a network to an SMSc 704 of a mobile network operator. Control logic 706 in the SMSc 704 receives the messages, recognizes that it is self-addressed—and preferably would perform a lookup to see if that user's number is registered—and correspondingly determines whether and where to communicate the message onwards to an external service provider. Communication of the message may be based on an extracted hash or product code obtained from the self-addressed message and cross-referenced into a receiving server's lookup table 708, or otherwise based on the sender's registration for the service (which again is resolved with reference to a look-up table). For example, in the latter case, if the sender's phone address is in the look-up table, then the received SMS message is relayed 710 (or the content/instruction of the message extracted and relayed either with or without encryption or formatting).

Messaging relay to the service administrator 16 and any interaction with the SMSc is functionally supported through an API 712 in the SMSc. The service administrator 16 may be realized by coding at the retailer's server or otherwise at a discrete server contracted by the retailer as a commercial intermediary that provides administration support and particularly message processing. In the event that the sender is not registered with a text-yourself purchase service, either a registration process can be initiated or the electronic message conveyed 713 to the sender's inbox (and any other identified addressee).

At the service administrator 16, the SMS and associated hash and/or product codes are received and the hash or product code is extracted and checked 714 against a database. Hash or product codes and multiple unique sender identifying numbers (acquired during user registration) are stored in databases 715 at the service administrator 16. In the event that the extracted code is not recognized having regard to the stored hash or product codes in database 715, e.g. the code is out of date or incorrect, then the service administrator acts to return a rejection message 716 to the SMSc via the API 712. The rejection message is then forwarded 718 to the sender/buyer 14. The rejection message can alternatively be sent from the server using an SMSc aggregator service, such as mBlox or OpenMarket. In the event that the extracted code is recognized, then dialogue control logic 720 in the service administrator enters into dialogue or handshaking with the sender/buyer 14, subject to there being a requirement for the sender/buyer to confirm the purchase instruction or supply additional information to identify the precise details of the order instruction. An order file is also created and stored. The order file permits the recording of the progress and state of each order, including any qualifying update about the nature of the order that arise from buyer directions received during interactive interrogation.

In terms of handshaking and message relay, this may be concentrated through an optional network aggregator 724. The dialogue control logic 720 can therefore generate and receive electronic message interactions, such as through the use of low-cost SMS sent via the API 712 of the SMSc 704. The optically direct dialogue with the buyer 14—in the sense that the SMSc is transparent within the messaging path—is used to clarify or interpret an order instruction initially received as the hash or product code in the original SMS message 700. The interactive messaging may include one or more loops, with the number of messages dependent upon whether order resolution can be settled finally at the service administrator. The interactions may include one or more of:

a request 728, 730 for enhanced detail on the nature of the order for the product and service;

a response "definition" 732, 734 providing buyer-entered information responding to the request for enhanced detail— the buyer entered information would be entered through the buyer's phone user interface, such as a cellphone keypad or the like. At the service administrator, the response definition is processed and the order information updated 735 and stored in a request database that stores specific order files for order management purposes;

a request 736, 738 by the dialogue control logic 720 to confirm 721 an understanding of the order from the buyer or provide a security code, the request for confirmation driven by the service administrator's logic concluding that it has received sufficient information to process the order instructed in the initial SMS 700 and now refined by appropriate interrogation 730 and update 735; and a buyer confirmation response 740, 742, 743 to the service administrator that confirms the buyer's intention to proceed with a defined order. Upon receipt of the confirmation message 742, which may be the first response or a subsequent response following a looped interrogation with the dialogue control logic, the control logic in the service administrator 16 is arranged to orchestrate and activate 743 debiting of the buyer's account (either locally held if there's advanced credit or via a third party financial service provider) to take payment 750. In the context of payment, promotional products offered to potential new customers may incur no financial charge whatsoever, so "payment" (or similar terms) should be viewed as including a financial transaction that involves the transfer of cash or credit assets, but equally also acceptance by the offeror to provide a service or goods without financial charge.

Buyer responses preferably always make use of self-addressed messaging, although forwarding of the original self-addressed message to the service provider identifies communication end-points that could be used to support direct and simplified end-to-end addressing until either the order is cancelled or the order is signed-off for delivery/dispatch.

With the taking of payment, the order is deemed complete by the service administrator and a further payment confirmation message may be electronically sent through the network (and via the SMSc 704) to the buyer 14. With completion of the payment, the service administrator activates 770 release of the product or service by cross-referencing a service or product look-up table 772 to identify and select the location of the product or service. The service or product look-up table 772 may therefore be realised by a stock control database that maintains a record of internal stock or a look-up table that provides a route pointer to a third party product or service supplier 780 that can be instructed to dispatch or deliver the product or service to the buyer 14. Instruction 774 of the third party product or service supplier 780 can be through a telephone instruction or via, for example, an email instruction or other electronic message served via a local API 782 located on a server of the third party product or service supplier 780. The instruction 774 includes all necessary information, e.g. updates and address data relevant for electronic or physical delivery of the goods or service(s), to permit the order to be fulfilled and dispatched 785. The term "dispatch" may relate to the physical dispatch of goods (including a software download), but also includes both the delivery or the provision of a service, e.g. arrangement of a time to conduct a service at a particular location or the registration of a purchase of time (such as in the case of buying a virtual car parking voucher for a fixed duration).

Unless the context requires a more specific meaning, the terms "deliver" or "delivery" should be understood to be the release of the goods or service for use or access by the buyer or their nominee. The service provider 780 may for example be a retail vendor providing physical goods, a registration service supplier taking payment for a service that are local to the user or a streaming or download service providing data at the request of the user.

Message handshaking may occur between the service administrator 16 and the third party product or service supplier 780 to ensure synchronization of data, order status and current progress of the order. The third party product or service supplier 780 is likely to maintain its own database 789 relating to instructions received from the service administrator 16, although this third party tracking is optional.

It will be understood that the third party database 789 may include a program repository that stores licensable software or firmware code or which temporarily buffers data to be streamed or provided as a digital service to the user upon the user's demand. Digital services accessible by the message ordering embodiment of this invention include, potentially, real-time or buffered television services.

In any event, dispatch of the instruction 774 to release the goods or services is recorded 790 in the specific order file associated with the specific order from the buyer 14.

Geo-Location and Smart Purchasing

In GPS-equipped devices as well as conventional handsets not themselves supporting independent location determination, estimated location can be used to reduce dialogue between the user and the administrator that manages the use of the text service described in relation to the various embodiments of the invention. Specifically, from the network side, uplink communication from a device permits the network controller to evaluate an approximate location of the device relative to base stations and, indeed, Cartesian coordinates on a map. In non-GPS devices, location can be signalled through base station triangulation algorithms or other known location-estimation algorithms based, for example, through base station signal strength/quality evaluation), and most importantly, activated by text-yourself text messages to identify a location for that unit at a particular time.

If coordinate information is shared with the administrator, the administrator is able to contextualize the service that the user of the device is likely to want to invoke. For example, if the administrator is aware that the device is located in a particular retail outlet (for example), then any interactive dialogue (as described in, for example, text-yourself purchase) with the device can assume the location and consequently reduce traffic and the detail in responses. The administrator can therefore operate to assume that the device is within a particular store based on location, or otherwise the user of the device may elect to "check-in" to the service with a text-yourself message saying "check-in, [store name]". The words "check-in" are therefore a trigger, with the name of the store resolvable by the system to confirm location. The service is preferably invoked using the self-addressed text message approach described herein.

At the point when the service administrator acknowledges or determines check-in, the administrator is preferably configured to notify one of more local retailers in the vicinity of the user. Notification may take the exemplary form of a photograph that is communicated to the retailer's server, or otherwise may be a password or other identifier unique to the registered user. At the same time, for reasons of security, the service administrator may optionally cause the sending of a security code, in a text message, to the registered user.

Once the user—through their active communication device—is logged by the system as being within a particular environment, such as a restaurant or bank or indeed the general area of a shopping centre, the user's communication device can be used to purchase goods or secure services. More particularly, a user—pre-registered with the text yourself service and thus having an active line of credit through an approved and validated financial account (such as a credit card or PayPal®)—can conclude the purchase at the point of sale in the following fashion:

1. Goods are conventionally checked-out by the retailer at a point of sale (PoS). The retailer now asks for payment.
2. The registered user can then elect to make the purchase through their registration with the text-invoked service.
3. If the user's biometric information, such as a photograph, has been communicated downlink to the retailer's server, this biometric information and/or a security code is communicated to (or made accessible at) the PoS. The PoS is then able to conclude the sale by contrasting the photograph with the user's appearance and/or by having the user confirm the security code, such as a 4-digit pin that has been sent by the administrator in a text message to the user at the point when the user was "checked in".

Using geo-location and text messaging, a registered user is therefore able to conclude shopping within that store or secure other services; this approach does not require a smartphone nor an app nor access to local WiFi.

Geo-location and smart purchase can be implemented independently of other embodiments of the invention since it provides a process for augmenting phone usage and an innovated and robust process for paying for goods or securing services.

Other applications for this geo-location approach include the purchase or release of a ticket for a concert at a manned or automated turnstile, or with the purchase of time for car parking With no PoS, the registered user invokes the service through a text-yourself activation, and then texts a purchase instruction, such as "buy 5 hours of parking time". The administrator, in appreciating approximate location and context for the message (based on trigger words and triangulation), sends a brief dialogue text message that confirms the service based on the nature of the location, e.g. "[User Name], send text to confirm you wish to pay for parking for registration number WN53 ABD for 5 hours in (1) short-stay car park at Market Street, or (2) long-stay parking at Market Street". Of course, the location may be deterministic in that the user has no option. In this instance, the car registration may be pre-registered with the administrator other otherwise communicated in a text message.

Upon receiving the confirmatory text from the user, the administrator server liaises with appropriate third party servers to conform payment and authorize use with that third party server.

Although this embodiment relates to a purchase environment, purchase is not necessary and the system can be employed to unlock a credit card whilst the user is within a branch of the issuing bank, for example.

Applications for "Text-Yourself" Ordering

The process of text-message buying or, more generally, "text-yourself" ordering, as outlined herein, can therefore find many applications. For example, a cellular phone (and not necessarily a smartphone) can use a product or hash code, conveyed in an electronic message to the SMSc, to bring about an update of a registered user's FaceBook® status or message board, to initiate a tweet on Twitter® or to change a Linkedin® status or similar.

The same process of embedding a code in a self-addressed SMS message can be used to: i) send a picture to Instagram® or Pinterest®; ii) pay for a vending machine item; iii) vote on TV or radio shows; iv) pay for car parking; v) pay for a mobile phone top-up; vi) check-in at an airport; vii) obtain a digital key for a hotel or car; viii) obtain a bank balance; ix) settle a debt to someone by authorising payment; x) send money; xi) send an email; xii) send photos via MMS to social networks; xiii) add an event to an electronic calendar; xiv) book a dental or doctor's appointment; xv) pay for a coffee (or some other product, such as a TV) locally at a coffee shop or store; xvi) publish text on a digital billboard; xvii) order and/or pay for food at a restaurant or takeaway; xviii) pay for tickets at the cinema or elsewhere; xix) pay a bill or charge for utilities; xx) text chat with a friend rather than use a short-code; xxi) enter a competition; xxii) bid on eBay®; send money using PayPal® by specifying the recipient's mobile number; xxiii) exercise an electoral register vote; xxiv) extend a bank overdraft or check a current account balance; xxv) order goods for pickup and authenticate proof using a returned order number code; xxvi) respond to bank's security questions after potentially fraudulent credit card activity; xxvii) purchase an app or ringtone for a smart phone; xxviii) donate money to a registered charity; xxix) check-in for a flight or train; xxx) order a courier and track a package; and xxxi) send yourself a scanned QR code or a taken photo to activate any of the above.

Gift Certificate Gifting

In yet another embodiment of the present invention in which a sender can bring about delivery of a gift to the physical real-world address of a virtually identified recipient (without the sender needing to know the physical real-world address), the administrator 16 (of FIG. 1) is configured to associate a commercially obtained gift code with a virtual address. Access to the gift code is controlled by the administrator 16, although in departing from the process of FIG. 3 the administrator is relieved from having to associate the virtual recipient address with the real-world recipient address since the intended recipient is placed in direct contact with the supplier 24.

More specifically, a gift-certificate app is provided to a mobile communications device, such as a smartphone or a functionally equivalent device that supports network access. The mobile device typically is personal property in that it belongs to the sender 14. The gift certificate app is instantiated to review a graphic user interface (GUI), with the gift certificate app providing an access route into the administrator's ordering interface.

The sender 14, using the gift certificate app, is permitted to order a product offered for sale on a third party server that the sender 14 seamlessly accesses and selects via the gift certificate app. The sender 14 therefore interacts with the administrator, whilst the administrator 16 is configured to access an application programming interface (API) at the third party server. Interoperation between the administrator and the supplier is codified through a network portal that accesses to the supplier's website and ordering system on behalf of the sender, with interoperation permitted through the API (as will be understood). The third party website is a supplier of goods and may actually be a virtual marketplace where multiple retailers are collected under a single umbrella web-site, such as supported by Amazon (see http://www.amazon.co.uk/).

The sender 14, who may not initially be registered for the gift certificate service of the gift certificate app, places an order with the administrator 16 for a particular product, such a camera offered via the supplier's website. The selected product is selected and notified to the administrator through use of the link to the product on the supplier's website. Explaining this differently, the combination of the GUI and intelligence at the administrator allows the administrator to acquire (from the sender 14) a product identity for a desired product offered by the supplier 24. Note that the administrator is responsible for conducting the transaction with the supplier 24 to secure commercial release of the ordered product, with this transaction seamless with respect to the sender 14.

The GUI of the gift certificate app running on the sender's mobile device (or the like) is configured to allow the sender to provide billing authorization to the administrator to permit the administrator 16 to obtain funds in payment for the product and the service provided by the administrator. For example, the GUI running on the sender's smartphone may solicit PayPal® or credit card details. As will be appreciated, the sender 14 is effectively registered with the administrator either at the point when contact is made or otherwise when the sender's banking details are securely shared with the administrator to permit the administrator to receive payment(s). Registration, as described above and as will be understood, therefore ties the sender to a unique identifier, such as cellphone number, IMEI, SIM number or an IP address or the like. The administrator stores this unique identifier for order tracking purposes and for use in streamlining interrogation and data processing of subsequent orders emanating from the unique identifier, e.g. billing information may be stored at the administrator to the extent that the sender can provide only a subset of initial information required for effective registration, i.e. confidential billing information can be securely stored by the administrator for authorised re-use with new sender orders.

At this point, using the administrator's networked connection to the supplier's API, the administrator secures a gift code (interchangeably understood or referred to as a unique redemption code or the like) for the product that has been selected and paid for by the sender for delivery to the virtually-identified recipient. From a practical perspective, it will be understood that the administrator itself has an active and secure account with the supplier 24, and whereby administrator account is debited by the supplier at the point of release of the gift code to the administrator. The administer stores this gift code against the sender's unique identity.

In contrast with other embodiments described above, the real-world address of the recipient does not need to be acquired and related to the virtual address of the recipient, although the contact and notification process to the recipient shares a high degree of commonality with the process described in FIG. 3 (for example). As will now be understood, at this point the administrator is in receipt of an order instruction identifying a specific product, payment for the order and a gift code released by the supplier as a credit against the product.

The administrator or sender can at this point operate to notify the intended recipient either through an indirect (spoofed) process or a direct contact process.

In the indirect approach, the administrator 16 constructs at least one electronic message (and possibly multiple messages) that are sent to the virtual address of the recipient (as provided by the sender). In the event that multiple messages are sent, these can be concatenated as a single linked message or sent as a succession of separate/distinct messages. The message (or messages) are structured to provide the recipient with:
  i) a personalised message constructed by the sender and conveyed to the administrator via the GUI. The personalised message is designed to help provide assurance that the message is genuine and from the sender, rather than spam;
  ii) a link message that contains a weblink (such as a url) to the product (ordered by the sender) as represented on the supplier's internet site. The link message is typically constructed as HTML code that actively links the recipient's web-browser to, for example, the specifically ordered camera on the Amazon® website; and
  iii) an instruction message that contains (at least) the acquired gift code and preferably an indication that the acquired gift code is active and can be used as payment for the release of the product by the supplier.

In the event that the administrator releases the messages to the recipient, it is preferable that the administrator "spoof" the sender's address; this has been described above. The reasons for spoofing are to provide a tenable and direct path between the recipient and the sender, which path provides for reassurance and a mechanism that mitigates the chance for the message(s) to be rejected either manually or by an installed spam filter (in the device having the recipient's virtual address).

In the event that the recipient receives the message(s) on a virtual address through a smartphone or the like that has network access, selection of the link message launches the supplier's webpage for the ordered product and, preferably, further automatically adds the product to a shopping basket (subject to appropriate coding and information exchange between the administrator and the supplier's ordering system). Alternatively, once on the webpage, the recipient can select the product in a conventional fashion, with the recipient then tasked to complete the transaction; this requires that they "checkout" by entering the supplied gift code relayed in the (second part of the) message. In a conventional approach, checkout also requires that the recipient enter a real-world delivery address into the supplier's website interface and delivery system, thereby allowing the ordered product to be delivered to the recipient at the confirmed real-world address. In this way, the administrator does not need to be informed of the real world address of the recipient, the sender can effect delivery of a product to an intended recipient by simply knowing a virtual address of the recipient and the recipient deals with the supplier directly with respect to delivery details.

Of course, the point of access to the supplier web-site could trigger the supplier's server to notify, i.e. push data to, the administrator of the recipient's real-world address, with this being possible by virtue of the fact that the gift certificate can be associated to the virtual address of the recipient. The administrator 16 may then cross-reference the real-world address of the recipient against their virtue address, with this cross-reference stored for future use by the administrator in future transaction events. Also, any pushing of recipient address data (or a simpler notification) permits the administrator to sign-off on the delivery of the product to the intended recipient and therefore allows the administrator to notify the sender that their gift has been received.

In certain jurisdictions, spoofing or faking of an originator may be prohibited by national telecommunications regulators. In this respect, an alternative "direct" approach to sending the aforementioned message(s) can be employed. Again, this approach is similar to that described earlier in this document under the sub-title: "*The Direct Contact Process and First Contact*". The direct approach still makes use of the common process up to the point when the administrator has acquired the gift code, but now changes message routing protocols. Specifically, the gift code is supplied to the sender's smartphone (or the like), with the gift certificate app operating a "tombstoning" approach where it temporarily drops out of the gift certificate app and launches a messaging application (such as SMS or the like) that is populated with data acquired from the administrator and/or gift certificate app. More specifically, in dropping out of the gift certificate app into the messaging app, a message is constructed and then (preferably automatically) sent to the recipient's virtual address. As before, the message or succession of messages provide:

i) a personalised message constructed by the sender and designed to help provide assurance that the message is genuine, rather than spam;

ii) a link message that contains a weblink (such as a url) to the product (ordered by the sender) as represented on the supplier's internet site. The link message is typically constructed as HTML code that actively links the recipient's web-browser to, for example, the specifically ordered camera on the Amazon® website. The link message can be acquired from the original order instruction to the administrator or otherwise in a return response that confirms acceptance of the order and/or payment by the administrator; and iii) an instruction message that contains (at least) the acquired gift code and preferably an indication that the acquired gift code is active and can be used as payment for the release of the product by the supplier. In this instance, the acquired gift code is therefore provided to the sender by the administrator 16 following placing of the order by the administrator with the supplier 24.

Once in receipt of the message(s) at the recipient's virtual address, the recipient is then able to contact the supplier directly and redeem the gift code to secure physical release and delivery of the product/gift (ordered by the sender). The process of checkout therefore returns to the process described above for the indirect/spoofed approach. Again, the supplier can notify the administrator of a relationship between the physical and virtual addresses of the recipient, but this is optional.

In terms of cancellation of a gift code for a purchased product, it is preferred that cancellation can be initiated at any time up to the point of gift code redemption. The cancellation process can be initiated by the sender (i.e. the originator of the order) or by the intended recipient.

Since the administrator 16 stores a relationship between, at least, the virtual recipient address and the real-world gift code, the system of this gift certificate gifting embodiment is robust enough to allow for re-sending of the gift code message(s) to the intended recipient and tracking of the delivery status by the sender through an enquiry propagated to the supplier via the administrator 16. Again, like other embodiments, products can therefore be delivered based on a gifting approach that does not require the sender to have any understanding of the physical real-world address of the recipient.

Observations on Initial Registration

Registration of a user may, for example, follow a procedure that requires entry of a short code on a keypad on a communication device, or may be based on some other predefined registration mechanism, e.g. such as message header interpretation where the control logic within a router, SMSc or network distribution point looks for a self-addressed, looped-back message either in isolation or combination with a trigger word or phrase (such as "register") within the payload/message portion of the text message. Registration typically will cause terms and conditions of use of the service to be communicated to the communication device, with display of the terms and conditions (or other information) accessed via a link in a registration response, e.g. "Thanks for registering with the text-gifting service provided by PG. Terms and conditions and help many be found through the following link. De-registration can be achieved at any point by texting the word "unsubscribe" to your own address"

Unless specific arrangements are mutually exclusive with one another, the various embodiments described herein can be combined to enhance system functionality and/or to produce complementary functions in the effective delivery of a gift. Such combinations will be readily appreciated by the skilled addressee given the totality of the foregoing description. Likewise, aspects of the preferred embodiments may be implemented in standalone arrangements where more limited functional arrangements are appropriate. For example (but without limitation), the process and technical arrangement of the "gift certificate gifting" can be treated as entirely independent innovation from the "Text Yourself Ordering" or "Text Message Gifting" processes or, as another example, different and independent of the process described under the heading "Intermediate Company Ping". Indeed, it will be understood that unless features in the particular preferred embodiments are expressly identified as incompatible with one another or the surrounding context implies that they are mutually exclusive and not readily combinable in a complementary and/or supportive sense, the totality of this disclosure contemplates and envisions that specific features of those complementary embodiments can be selectively combined to provide one or more comprehensive, but slightly different, technical solutions.

The present invention may be provided in a downloadable form or otherwise on a computer readable medium, such as a CD ROM, that contains program code that, when instantiated, executes the link embedding functionality at a web-server or the like.

It will, of course, be appreciated that the above description has been given by way of example only and that modifications in detail may be made within the scope of the present invention. For example, at the point of set-up, it is not necessary to record financial details, since these can be secured at the point of first order or otherwise at each time of placing an order. However, recording secure banking details only once (rather over a number of successive events) is preferable since it reduces the data transfer burden of sensitive client (i.e. sender) details. As another example, although self-addressed messaging is a preferred structure for text-yourself ordering/buying, it is possible for the initial registration process to make use of an address expressly specified to invoke the service. If this is the case, then the buyer sends this specified address in an initial uplink SMS message, with the SMSc configured to interpret this specified address as a routing instruction and/or a registration request for the ordering service. Functionally, the SMSc eventually still pushes the message to an external server for order processing and operates to see that all future messages (sent from the now-registered sender device) that contain this pre-specified address are routed to the administering server for the ordering service.

Unless the surrounding context otherwise requires a more limited interpretation, the term "gift" should be interpreted widely to be any good or service that is to be delivered to a physical address of a virtually-identified recipient. The gift, although possibly subject to a financial transaction, does not necessarily require the sender to meet any financial commitment.

Although the term SMSc usually means a specific piece of hardware having a particular SMS function within the network, it will be understood that appropriately configured electronic messages can alternatively be intercepted by an appropriately configured piece of intercepting infrastructure placed in the communication path. The term SMSc should therefore be viewed as exemplary with respect to where control logic and any necessary API can be located. Indeed, it is preferred that the SMSc is augmented by external logic running on independent servers since this maintains the integrity of existing SMSc firmware and functionality. This external logic, whilst providing a distributed platform, undertakes the assessment about each received messages to identify relevant messages that refer to the registered identity that is required (for example) with the text yourself ordering implementation. The SMSc, of the preferred embodiment, is therefore substantially unchanged from a conventional network device, with it configured to receive a text message from a user and then to push the message for fulfilment of a server-administered function at a connected networked server. Control logic, as an adjunct to the SMSc (or integrated as another option) makes the routing assessment of the received messages in that the logic looks for the presence or absence of a registered identity, such as a looped self-address.

The skilled addressee will appreciate that process steps may be performed in a different sequence from that described, subject to the re-arranged steps and procedures securing the same technical result of allowing a product or service to be sent or order by a third party without that third party necessarily possessing the real world delivery address.

It will be understood that the administrator of FIG. 1 can, in fact, be considered as a retail entity operating a website through which products and/or services can be purchased. However, the administrator is typically realized as a standalone customer service. Unless a specific context in this description and appended claims requires a limited interpretation, the term "product" should be understood to include goods and/or a service that is delivered subject either to a financial charge or free, as the case may be. Also, unless the context requires a specific and more limited interpretation, the terms "fake" or "faking" and "spoof" or "spoofing" should be considered to be equivalent since they represent a process of suggesting the origin of a message emanates directly from the sender, rather than factually from an intermediary device or system, namely the administrator. The nature of embodiments of the invention therefore seek to provide trust in the message recipient by providing a degree of assurance that that message is from a known sender.

Use of the term "electronic message" should be understood to relate to any wireless or wireline communication protocol that makes use of an electronic device to assemble and send a data message, including a packet-based message (such as an email) or its equivalent. The term therefore encompasses SMS and other signalling schemes employed in the electronic communication of data.

It will be further appreciated that the operating instructions, especially the OrderApp software may be provided in the form of a software product delivered in a tangible form on a CD ROM or the like or otherwise by way of an electronic download of program code.

The invention claimed is:

1. A method of accessing and controlling a server-administered function via a network controller of a text messaging system, the server-administered function running on a server functionally distinct to the network controller and wherein the server-administered function provides a user with a service when the user communicates a registered identity, the method comprising:
   at the network controller, receiving over a communications network multiple text messages that each contain a recipient address and a sender address;
   using control logic to make an assessment about each of said received text messages to identify:
   i) as a relevant message, a text message that includes a self-addressed routing direction that includes common recipient and sender addresses, wherein presence of the self-addressed routing direction in the text message confirms the registered identity and wherein the recipient address includes a mobile number of the sender address, the text message further including a body portion containing an instruction; and
   ii) other messages that do not contain any self-addressed routing direction and are messages that are unrelated to control of the server-administered function;
   based on the assessment, causing the network controller to select each relevant message and communicate at least part of each relevant message to said server, otherwise causing the network controller to route over the communications network each of said other messages to said recipient address identified in that other message;
   deriving the instruction from the relevant message, the instruction relating to the service; and
   at the server, invoking the server-administered function based at least in part on the instruction derived from the relevant message, and through a user device that was used to send the self-addressed routing direction, controlling execution of the service, wherein information relating to the service provided by the server is returned to the user device via the network controller.

2. The method of accessing and controlling a server-administered function according to claim 1, wherein the step of invoking the server-administered function establishes text messaging dialogue between said server and the device that communicated the self-addressed routing direction.

3. The method of accessing and controlling a server-administered function according to claim 2, wherein the text message dialogue is bi-directional between both said server and the device.

4. The method of accessing and controlling a server-administered function according to claim 1, wherein the server is remotely located from the network controller and communication of said at least part of each relevant message to said server is over the communications network.

5. A method of accessing and controlling a server-administered function on a server located remotely from a network controller of a text messaging system, the server connected to the network controller through a communications network and wherein the server-administered function provides a user with a service when the user communicates a registered identity associated with either the user or a device used by the user to compile a text message, the method comprising:
   at the network controller, receiving over the communications network multiple text messages that each contain a recipient address and a sender address;
   using control logic to make an assessment about each of said received text messages to identify a relevant message that refers to the registered identity, said relevant message being a text message that includes a self-addressed routing direction that includes common recipient and sender addresses, wherein presence of the self-addressed routing direction in the text message confirms the registered identity and wherein the recipient address includes a mobile number of the sender address;
   causing the network controller to communicate at least part of the relevant message to said remotely located server;
   deriving an instruction from each relevant message, the instruction relating to the service; and
   at the server, invoking the server-administered function for said desired service based at least in part on the instruction derived from the relevant message, and through the device used to compile the text message with the self-addressed routing direction, controlling execution of the desired service on the server, the text message further including a body portion containing the instruction, wherein information relating to the desired service provided by the server is returned to said device via the network controller.

6. The method of accessing and controlling a server-administered function according to claim 5, wherein the step of invoking the server-administered function is triggered by the text message having a self-addressed routing direction.

7. The method of accessing and controlling a server-administered function according to claim 6, wherein selective communication of the relevant message is based at least in part of a trigger word or trigger phrase included in the received text message.

8. The method of accessing and controlling a server-administered function according to claim 6, wherein the instruction derived from the relevant message is content contained within a body portion of the text message.

9. The method of accessing and controlling a server-administered function according to claim 6, further comprising:
routing the text message to another address in the event that the assessment identifies that the registered identity is not present.

10. The method of accessing and controlling a server-administered function according to claim 6, wherein the assessment step is conducted at the network controller.

11. The method of accessing and controlling a server-administered function according to claim 6, wherein access to the server tasked with exercising the server-administered function occurs via an administrator server positioned in a communications path between the network controller and the server.

12. The method of accessing and controlling a server-administered function according to claim 6, further comprising:
at the network controller, routing the received text message to another address in the event that a determination identifies that:
registration is not sought from a device used to compile the text message; or
registration of the device for the service has not previously occurred; or
an address header of the text message does not contain a looped routing direction.

13. The method of accessing and controlling a server-administered function according to claim 5, further comprising:
following said receipt of at least part of the relevant message at said remotely located server, assessing completeness of the instruction received in the relevant message; and
based on the assessment of completeness, establishing an interactive dialogue between the server and the user, the interactive dialogue seeking or providing additional detail concerning the instruction.

14. The method of accessing and controlling a server-administered function according to claim 6, wherein the text message is one of:
an SMS message; and
a text message that at least partially uses a proprietary text messaging protocol.

15. The method of accessing and controlling a server-administered function according to claim 6, wherein the server-administered function permits a function selected from the group comprising:
i) sending a picture;
ii) pay for a vending machine item;
iii) voting on a live TV or radio show;
v) paying for car parking;
v) paying for a mobile phone top-up;
vi) checking-in at an airport;
vii) obtaining a digital key for a hotel or car;
viii) obtaining a bank balance;
ix) settling a debt to someone by authorising payment;
x) sending money;
xi) sending an email;
xii) accessing and controlling a personal social networking site;
xiii) adding an event to an electronic calendar;
xiv) booking a dental or doctor's appointment;
xv) paying for delivery of an ordered product or service;
xvi) publishing text on a digital billboard;
xvii) ordering and/or paying for food at a restaurant or takeaway;
xviii) paying for tickets at the cinema or elsewhere;
xix) paying a bill for a utility charge;
xx) entering a competition;
xxi) bidding on an on-line auction site;
xxii) exercising an electoral register vote;
xxiii) managing a bank account;
xxiv) ordering goods for pickup and authenticating proof using a returned order number code;
xxv) purchasing an app or ringtone for a smart phone;
xxvi) donating money to a registered charity;
xxvii) ordering a courier
xxviii) tracking a package;
xxix) qualifying an order for a product or service; and
xxx) sending a scanned QR code.

16. A system supporting remote control of a server-administered function, the system comprising:
a network controller of a text messaging system, the network controller configured to receive multiple text messages;
a server supporting the server-administered function and configured to provide a user with a service in response to the user communicating a registered identity, the server functionally distinct to the network controller;
a communications network supporting at least transmission of multiple text messages, each text message including a recipient address and a sender address;
control logic configured to make an assessment about each of said received messages to identify:
i) as a relevant message, a text message that includes a self-addressed routing direction that includes common recipient and sender addresses, wherein presence of the self-addressed routing direction in the text message the registered identity and wherein the recipient address includes a mobile number of the sender address, and said text message further includes a body portion containing an instruction; and
ii) other messages that do not contain any self-addressed routing direction and are messages that are unrelated to control of the server-administered function;
wherein the network controller, responsive to the assessment, is configured to select each relevant message and to communicate at least part of each relevant message to said server, otherwise to cause the network controller to route over the communications network each of said other messages to said recipient address identified in that other message; and
the server is configured to derive the instruction relating to the service supported by the server from a received relevant message and the server is further configured to support access to the service through a user device that was used to send the self-addressed routing direction by invoking the server-administered function based at least in part on the instruction derived from the relevant message, thereby to support access of the user to the service, and the service executing on the server is operationally responsive to the user device that was used to send the self-addressed routing direction, and wherein information relating to the service provided by the server is returned to the user device via the network controller.

17. The system according to claim 16, wherein the server is configured to establish a text messaging dialogue between said server and the device that communicated the self-addressed routing direction to support said server-administered function, and wherein the server function supports purchase of at least one of a product and a service.

18. The system according to claim 16, wherein the server is remotely located from the network controller and communication of at least part of each relevant message to said server is over the communications network.

19. A system supporting remote control of a server-administered function, the system comprising:
a server supporting the server-administered function thereby to provide a user with a service in response to the user communicating a registered identity associated with either the user or a device used by the user to compile a text message;
a network controller of a text messaging system, the network controller located remotely from the server and arranged to receive multiple text messages that each contain a recipient address and a sender address;
a communications network connecting the network controller to the server, the communication network supporting at least transmission of text messages:
control logic configured to make an assessment about each of said received messages to identify a relevant message that refers to the registered identity, said relevant message being a text message that includes a self-addressed routing direction that includes common recipient and sender addresses, wherein presence of the self-addressed routing direction in the text message confirms the registered identity and wherein the recipient address includes a mobile number of the sender address;
wherein the network controller, in response to the assessment of the control logic, is configured to communicate at least part of the relevant message to said remotely located server; and
the server is configured to support access of the user to the service through a user device by invoking the server-administered function based at least in part on an instruction derived from the relevant message, wherein the instruction relates to the service supported by the server, the server is configured to derive an instruction from each relevant message, the instruction relating to the service that is desired, and the server is configured to invoked the server-administered function for said desired service based at least in part on the instruction derived from the relevant message; and
wherein through the device used to compile the text message with the self-addressed routing direction, controlling execution of the desired service on the server, the text message further including a body portion containing the instruction, wherein information relating to the desired service provided by the server is returned to said device via the network controller.

20. The system of claim 19, wherein invoking the server-administered function is based on the nature of addressing of the text message as received at the network controller.

21. The system of claim 19, wherein invoking the server-administered function is triggered by the text message having a self-addressed routing direction.

22. The system of claim 19, wherein selective communication of the relevant message is based at least in part of a trigger word or trigger phrase included in the received text message.

23. The system of claim 21, wherein the network controller is configured to route the text message to another address in the event that the assessment identifies that the registered identity is not present.

24. The system of claim 21, wherein the network controller includes the control logic configured to identify the relevant message that references the registered identity.

25. The system of claim 19, wherein the control logic is remote to and external from the network controller, the control logic arranged to reference to a look-up table networked within the system, the look-up table preferably in the network controller.

26. The system of claim 21, further comprising an administrator server positioned in a communications path between the network controller and the server, and wherein access to the server invoking the server-administered function occurs via the administrator server.

27. The system of claim 21, wherein the network controller is configured to route the received text message to another address in the event that a determination identifies that:
registration is not sought from the device used to compile the text message; or
registration of the device for the service has not previously occurred; or
an address header of the text message does not contain a looped routing direction.

28. The system of claim 21, wherein the server is configured:
following receipt of said at least part of the relevant message, to assess completeness of the instruction received in the relevant message; and
based on the assessment of completeness, establish an interactive dialogue between the server and the user, the interactive dialogue seeking or providing additional detail concerning the instruction.

29. The system of claim 21, wherein the network controller is an SMSc.

30. The system of claim 21, wherein the assessment of access to the service is based on at least one of:
i) an address of the device used to compile the text message;
ii) a user identity of the user of the device;
iii) a mobile telephone number; and
iv) a digital fingerprint realizing a device identity unique to the device used to compile the text message.

* * * * *

UNITED STATES PATENT AND TRADEMARK OFFICE
CERTIFICATE OF CORRECTION

PATENT NO. : 8,954,349 B2  
APPLICATION NO. : 14/216702  
DATED : February 10, 2015  
INVENTOR(S) : Tolcher Page 1 of 1

It is certified that error appears in the above-identified patent and that said Letters Patent is hereby corrected as shown below:

Title page

Item (73) Assignee: delete "Limited (GB)" and insert --Limited, Brighton, West Sussex (GB)--.

Signed and Sealed this  
Sixth Day of October, 2015

Michelle K. Lee  
*Director of the United States Patent and Trademark Office*